US009781914B2

(12) United States Patent
Mercier

(10) Patent No.: US 9,781,914 B2
(45) Date of Patent: Oct. 10, 2017

(54) SYSTEM AND METHOD FOR MOBILE SUBVEHICULAR ACCESS AND TREATMENT OF GROUND SURFACES ABOUT OCCUPIED RAIL TRACKS

(71) Applicant: Craig Mercier, Harmans, MD (US)

(72) Inventor: Craig Mercier, Harmans, MD (US)

( * ) Notice: Subject to any disclaimer, the term of this patent is extended or adjusted under 35 U.S.C. 154(b) by 0 days.

(21) Appl. No.: 15/336,384

(22) Filed: Oct. 27, 2016

(65) Prior Publication Data

US 2017/0042137 A1    Feb. 16, 2017

Related U.S. Application Data

(63) Continuation of application No. 14/382,227, filed as application No. PCT/US2013/028710 on Mar. 1, 2013, now Pat. No. 9,493,916.

(Continued)

(51) Int. Cl.
*A01M 7/00* (2006.01)
*E01C 19/20* (2006.01)
(Continued)

(52) U.S. Cl.
CPC ......... *A01M 7/0014* (2013.01); *A01C 15/007* (2013.01); *A01C 17/001* (2013.01);
(Continued)

(58) Field of Classification Search
CPC ................. E01C 19/201; E01C 19/203; E01C 2019/2075; E01C 2019/208;
(Continued)

(56) References Cited

U.S. PATENT DOCUMENTS 1,238,861 A * 9/1917 Williams et al. ...... F02M 53/06
                                                                 122/462
3,785,564 A * 1/1974 Baldocchi ........... A01M 7/0082
                                                                   172/2
(Continued)

FOREIGN PATENT DOCUMENTS

CA        196262 A     1/1920
GB       2327587 A     2/1999
(Continued)

*Primary Examiner* — Ryan Reis
(74) *Attorney, Agent, or Firm* — Rosenberg, Klein & Lee

(57) ABSTRACT

A system and method are provided for subvehicularly accessed treatment of ground surfaces about a rail track occupied by a rail vehicle. A mobile treatment unit having a propulsion mechanism for subvehicular passage between the rails occupied by the rail vehicle includes a dispensing portion for expelling a treatment material therefrom onto regions of the ground surface about the rails. The mobile treatment unit is maneuverable between the rails and maintains height clearance for unobstructed passage beneath the occupying rail vehicle. At least one sensor unit is coupled to the mobile treatment unit, which acquires environmental feedback data about the mobile treatment unit. A control unit is operably linked to the mobile treatment and sensor units, and receives the environmental feedback data. The control unit controls actuation of the mobile treatment unit responsive to the environmental feedback and/or a maneuver control command.

20 Claims, 21 Drawing Sheets

Related U.S. Application Data

(60) Provisional application No. 61/605,832, filed on Mar. 2, 2012.

(51) Int. Cl.

| | | |
|---|---|---|
| *A01C 15/00* | (2006.01) | |
| *A01C 17/00* | (2006.01) | |
| *B05C 5/02* | (2006.01) | |
| *B05C 11/10* | (2006.01) | |
| *B05D 1/02* | (2006.01) | |
| *E01B 27/10* | (2006.01) | |
| *B05B 13/00* | (2006.01) | |
| *E01H 8/10* | (2006.01) | |

(52) U.S. Cl.
CPC ........ *A01M 7/0082* (2013.01); *A01M 7/0089* (2013.01); *B05B 13/005* (2013.01); *B05C 5/02* (2013.01); *B05C 11/10* (2013.01); *B05D 1/02* (2013.01); *E01B 27/102* (2013.01); *E01C 19/203* (2013.01); *E01H 8/10* (2013.01)

(58) Field of Classification Search
CPC ....... E01C 2019/2085; E01C 2019/209; A01C 15/007; A01C 15/18; A01C 17/001; A01C 17/005; A01M 7/0014
See application file for complete search history.

(56) References Cited

U.S. PATENT DOCUMENTS

| | | | |
|---|---|---|---|
| 5,022,812 A | | 6/1991 | Coughlan et al. |
| 5,381,958 A | * | 1/1995 | Koblmuller ............ E01H 11/00 104/279 |
| 5,397,056 A | | 3/1995 | Sakatani et al. |
| 5,451,135 A | | 9/1995 | Schempf et al. |
| 5,499,462 A | * | 3/1996 | Forsdahl ................ E01C 19/205 239/130 |
| 5,927,601 A | | 7/1999 | Newson et al. |
| 6,092,745 A | * | 7/2000 | Seymour ................... A01C 3/06 239/63 |
| 6,148,732 A | * | 11/2000 | Conway ................... E01H 8/105 104/279 |
| 6,336,600 B1 | | 1/2002 | Jessen |
| 6,611,738 B2 | | 8/2003 | Ruffner |
| 6,671,582 B1 | | 12/2003 | Hanley |
| 7,163,227 B1 | | 1/2007 | Burns |
| 7,654,348 B2 | | 2/2010 | Ohm et al. |
| 7,854,108 B2 | | 12/2010 | Koselka et al. |
| 7,926,598 B2 | | 4/2011 | Rudakevych |
| 2003/0226916 A1 | | 12/2003 | Hoyle |
| 2009/0173553 A1 | | 7/2009 | Won |
| 2010/0179691 A1 | | 7/2010 | Gal et al. |
| 2010/0201143 A1 | | 8/2010 | Ehnes et al. |
| 2011/0167574 A1 | | 7/2011 | Stout et al. |
| 2011/0210186 A1 | | 9/2011 | Kugler et al. |
| 2012/0234934 A1 | * | 9/2012 | Score ..................... E01C 19/203 239/7 |

FOREIGN PATENT DOCUMENTS

| | | |
|---|---|---|
| RU | 2188543 C2 | 9/2002 |
| RU | 2219770 C2 | 12/2003 |

\* cited by examiner

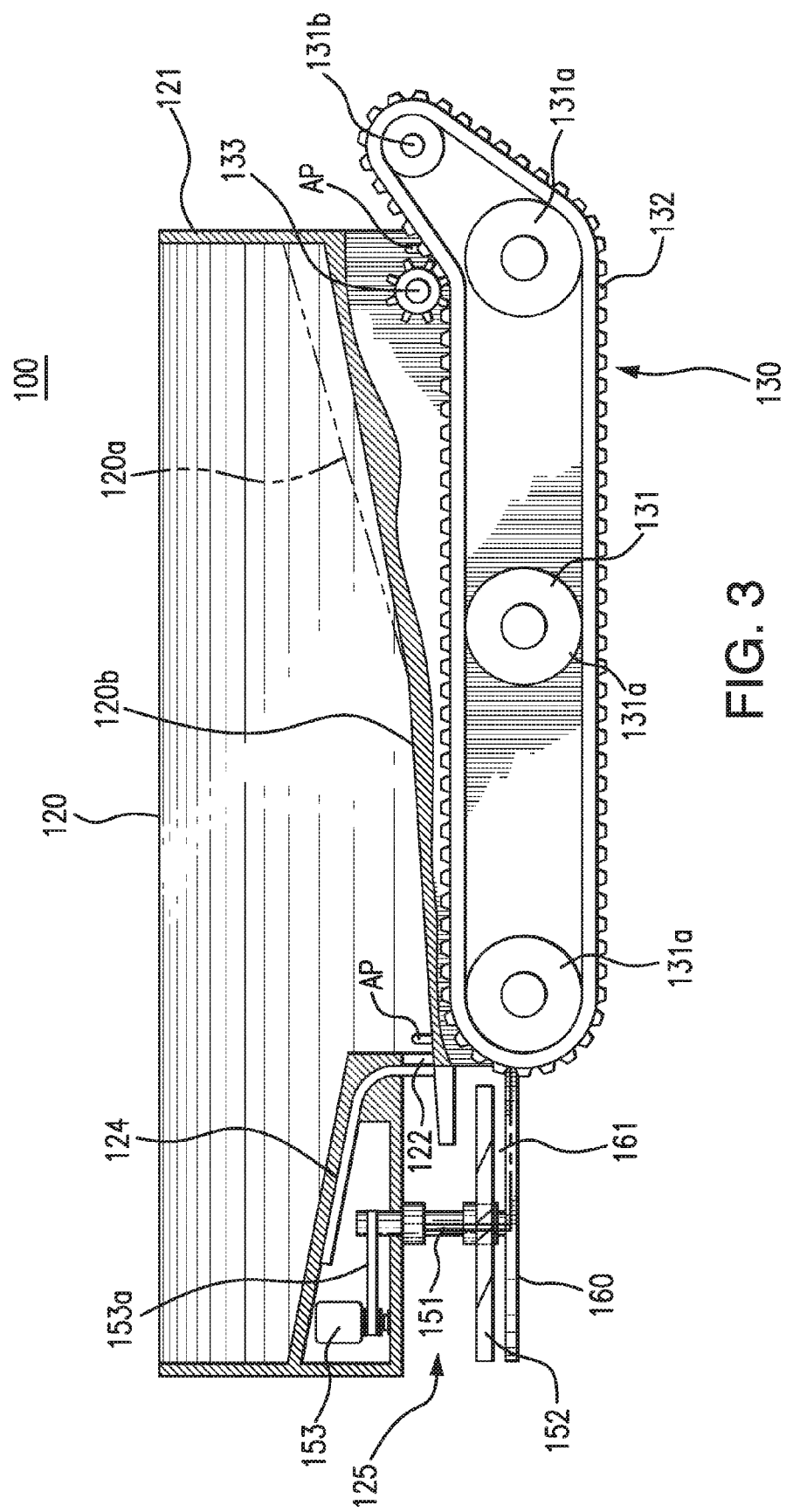

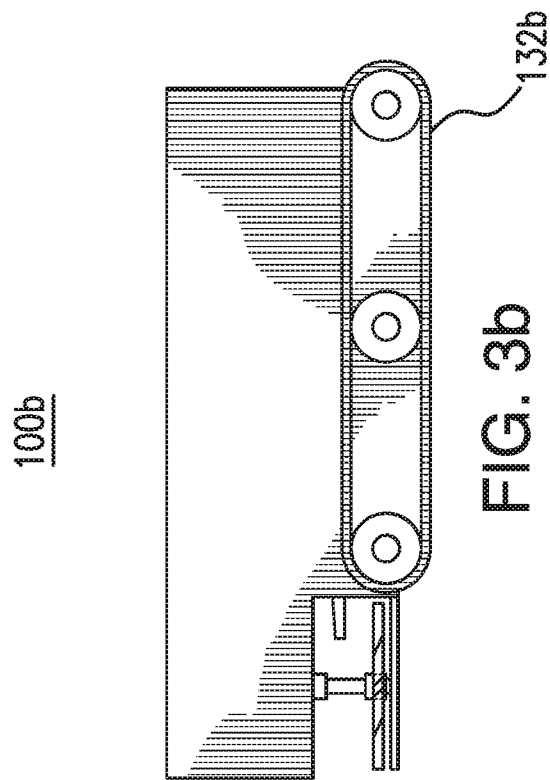
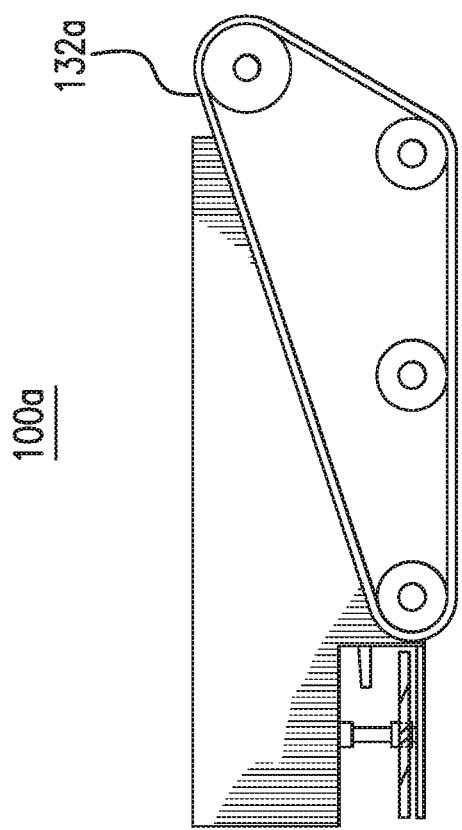
FIG. 3b
FIG. 3a

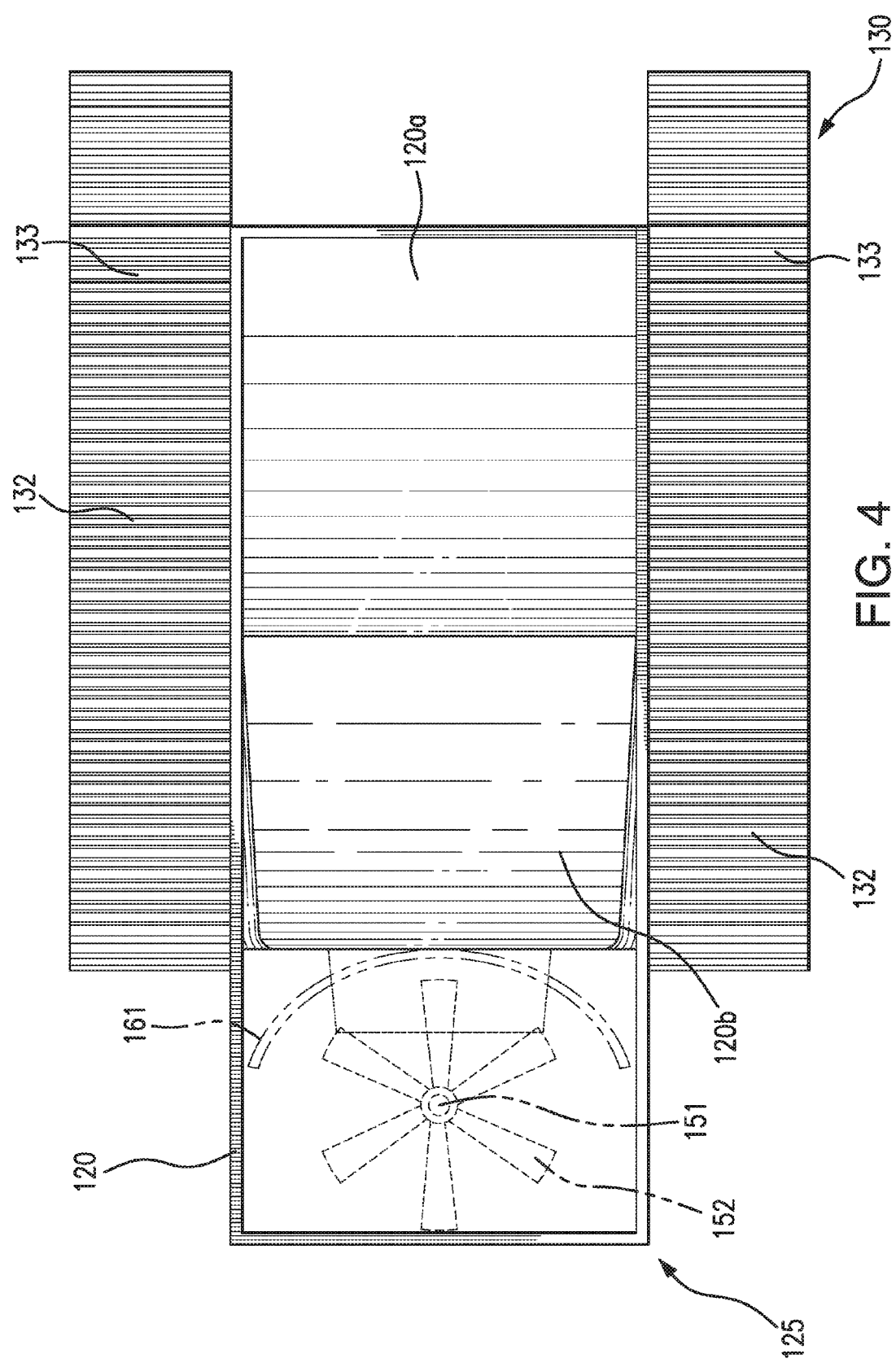

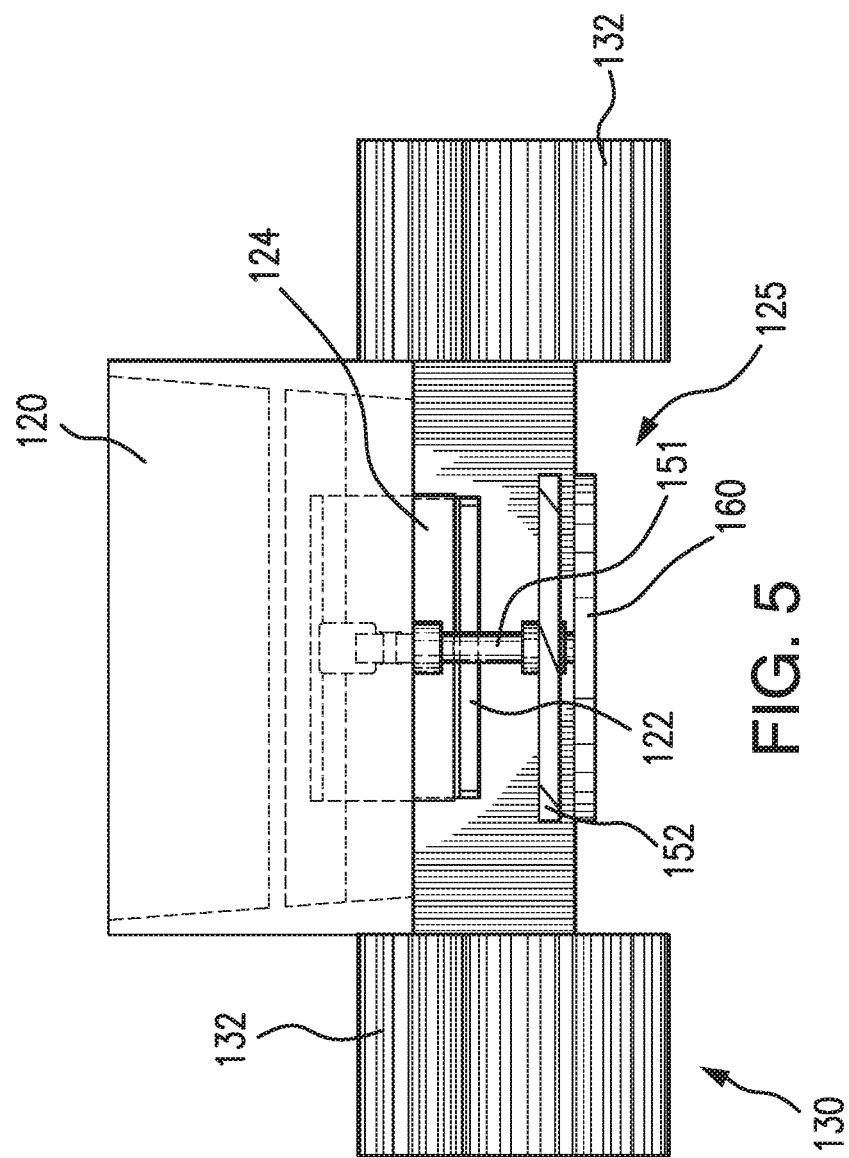

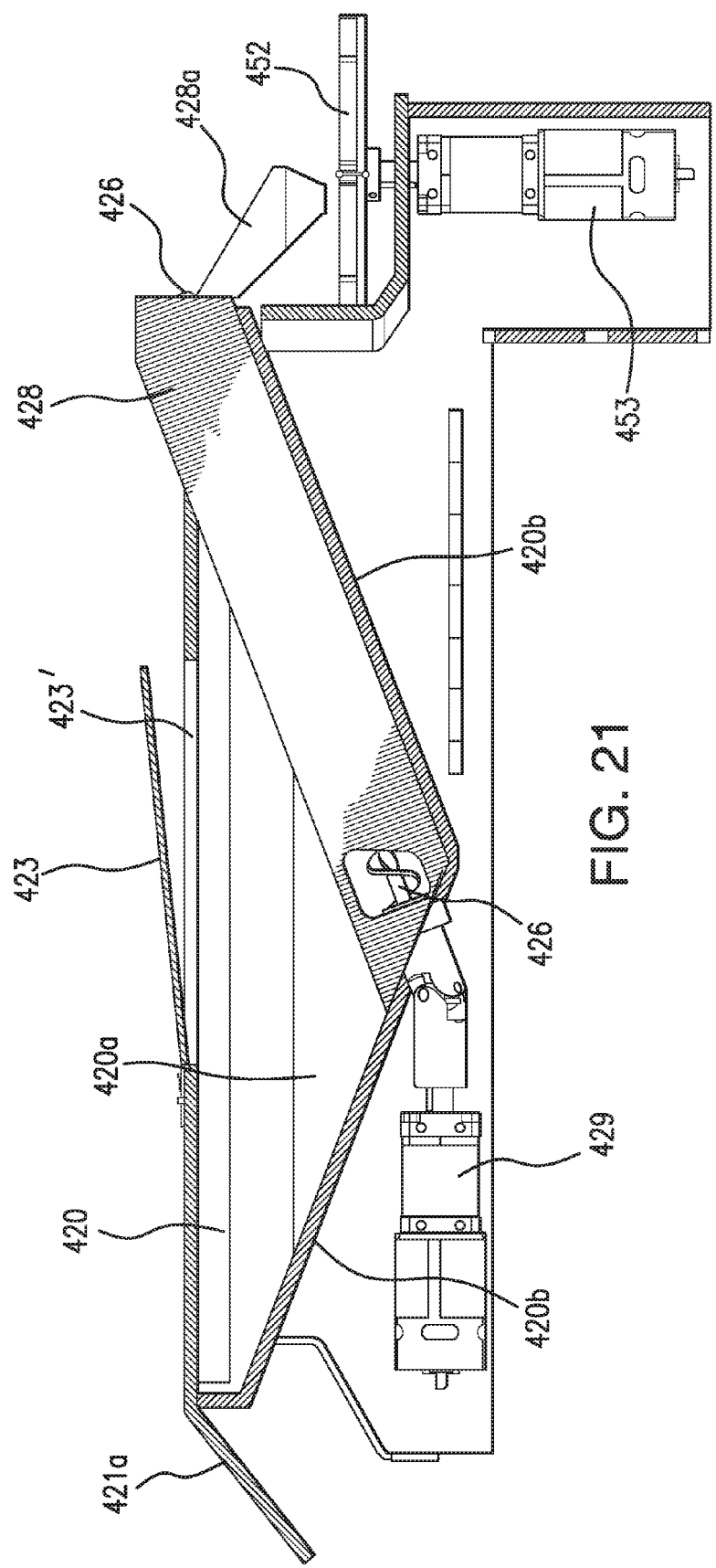

SYSTEM AND METHOD FOR MOBILE SUBVEHICULAR ACCESS AND TREATMENT OF GROUND SURFACES ABOUT OCCUPIED RAIL TRACKS

RELATED APPLICATION DATA

This application is a Continuation of co-pending application Ser. No. 14/382,227, filed 29 Aug. 2014, based on PCT Application No. PCT/US13/28710, filed 1 Mar. 2013, which was based on Provisional Patent Application No. 61/605,832, filed 2 Mar. 2012.

BACKGROUND OF THE INVENTION

The present invention is generally directed to the treatment of ground surface areas about rail tracks which are occupied by rail vehicles. More specifically, the present invention provides for mobile subvehicular access to such occupied rail tracks for the efficient treatment of ground surfaces while the rail vehicles remain in situ.

To ensure safe rail systems, the efficient treatment and eradication of weeds about ground surface areas around railway tracks are important aspects of railroad maintenance. These ground surface areas about rail tracks, including the roadbed foundation of the rail tracks, the track ballast material on which the track's rails and ties are laid, and the surrounding right of way areas extending along the tracks, require persistent monitoring for and control of unwanted vegetation growth, particularly the growth various stubborn weeds. Weed growth can create fire and tripping hazards which if not adequately controlled may keep a railroad from passing the required regulatory inspections. To abate such hazards and keep rail tracks safe, herbicide (and/or other material) treatment measures employing hi-rail spray trucks are conventionally used for mobile treatment along rail tracks, including the tracks at rail yards. These spray truck vehicles are equipped with pneumatically powered retractable wheels resembling train wheels, which enable them to travel on rail tracks much like a train or other rail vehicle would. Typically, a hi-rail sprayer truck drives onto a train track and once properly positioned and aligned over the track's rails, extends its retractable wheels to descend and lock onto the head portion of the parallel rails. By these retractable wheels the hi-rail spray truck is able to drive on the parallel rails while spray-treating the ground surfaces about the track along the way.

Where a rail track is occupied by a train car or other rail vehicle, such spray truck is obstructed, such that it cannot continue the treatment at or beyond the obstructing rail vehicle. This is typically the case in rail yards where one or more rail vehicles are invariably parked on at least some of the rail track segments. Thus, before any spray treatment of the rail yard may begin, all of the rail cars must be moved off and out of the way from the track segments to be treated. This often requires much time consuming and labor intensive effort, with operators having to start up otherwise dormant locomotives, hook parked and train cars to them, haul the cars out of the way to allow access to the spray truck, then return the cars and locomotive back to their original parked positions in the rail yard afterwards. Such a process not only consumes much time and coordinated effort, it is expensive.

Furthermore, hi-rail spray trucks are typically configured to spray liquid herbicide or other treatment materials, which are subject to freezing in certain temperatures. Thus, treatment is unduly subject to weather conditions, and generally limited to only certain months of the year. The combined effect of these and other shortcomings in practice is to limit access to conventional spraying/treatment of ground surfaces at rail tracks in settings such as rail yards where the rail tracks tend to be occupied by a rail vehicle. There is therefore a need for a more time, labor, and cost effective system and method for mobile treatment about rail tracks in such settings. There is a need for such system and method adaptable enough to dispense a treatment material in either liquid and/or solid form. There is, moreover, a need for such system and method for mobile treatment of ground surfaces about rail tracks which remain occupied by a rail vehicle.

SUMMARY OF THE INVENTION

It is an object of the present invention to provide a system and method for mobile treatment of ground surfaces about occupied rail tracks.

It is another object of the present invention to provide a system and method for mobile treatment of ground surfaces about rail tracks capable of dispensing treatment material in liquid or solid form.

It is a further object of the present invention to provide a system and method for subvehicular access to occupied rail tracks for treatment of ground surfaces thereabout with occupant rail vehicles remaining in situ.

These and other objects are attained in a system for subvehicularly accessed treatment of ground surfaces about a rail track occupied by a rail vehicle. A mobile treatment unit having a propulsion mechanism for subvehicular passage between the rails occupied by the rail vehicle includes a dispensing portion for expelling a treatment material therefrom onto regions of the ground surface about the rails. The mobile treatment unit is maneuverable between the rails and maintains height clearance for unobstructed passage beneath the occupying rail vehicle. At least one sensor unit is coupled to the mobile treatment unit, which acquires environmental feedback data about the mobile treatment unit. A control unit is operably linked to the mobile treatment unit and sensor unit. The control unit receives the environmental feedback data, and controls actuation of the mobile treatment unit responsive to at least one of the environmental feedback and a maneuver control command.

In certain embodiments, a method is provided for subvehicularly accessed treatment of ground surfaces about a rail track occupied by a rail vehicle. A mobile treatment unit is established having a propulsion mechanism and including at least one sensor unit coupled thereto to capture environmental feedback data about the mobile treatment unit. The mobile treatment unit is positioned between the rails occupied by the rail vehicle for subvehicular passage therealong. The mobile treatment unit is actuated to dispense a treatment material therefrom onto regions of the ground surface about the rails while maneuvering the mobile treatment unit between the rails. A height clearance is maintained for unobstructed passage of the mobile treatment unit beneath the occupying rail vehicle. The mobile treatment unit is controlled through a communications link maintained therewith, responsive to at least one of the environmental feedback and a maneuver control command input to the control unit.

In certain other embodiments, system is provided for treatment of a ground surface about a rail track having a pair of substantially parallel rails, with a rail vehicle occupying the rail track remaining in situ thereon. The system comprises a mobile treatment unit movably disposed for subvehicular passage between the rails underneath the rail vehicle.

The mobile treatment unit includes a storage compartment defining a space for holding a treatment material, which storage compartment includes a power driven actuator assembly for regulating the passage of the treatment material therethrough. A dispensing portion coupled is to the storage compartment for expelling the treatment material passed thereto from the storage compartment. The dispensing portion includes a rotary spreader mechanism disposed beneath an outlet of the storage compartment for collecting and projecting outward the treatment material passed from the storage portion. The rotary spreader mechanism thereby spreads the treatment material onto regions of the ground surface adjacent the rails. At least one sensor unit is coupled to the mobile treatment unit. The sensor unit acquires environmental feedback data about the mobile treatment unit. A control unit is remotely disposed from the mobile treatment unit, and is operably coupled to the mobile treatment unit by a wireless communications link. The control unit receives the environmental feedback data acquired by the sensor unit, wherein the control unit controls actuation of the mobile treatment unit responsive to at least one of the environmental feedback and a maneuver control command to selectively maneuver the mobile treatment unit in between the rails and selectively actuate dispensing of the treatment material therefrom. The mobile treatment unit is configured to maintain sufficient clearance along a full length of the occupying rail vehicle for unobstructed passage therebeneath.

BRIEF DESCRIPTION OF THE DRAWINGS

FIG. 3 is a side elevational view, partially cut away, of a mobile treatment unit formed in accordance with an exemplary embodiment of the present invention for use in the system illustrated in FIG. 2;

FIG. 3*a* is a schematic elevational view of an alternate variation of the mobile treatment unit embodiment shown in FIG. 3;

FIG. 3*b* is a schematic elevational view of another alternate variation of the mobile treatment unit embodiment shown in FIG. 3;

FIG. 4 is a plan view of the mobile treatment unit embodiment of FIG. 3;

FIG. 5 is a rear elevational view of the mobile treatment unit embodiment of FIG. 3;

DESCRIPTION OF THE PREFERRED EMBODIMENTS

Figure 1:
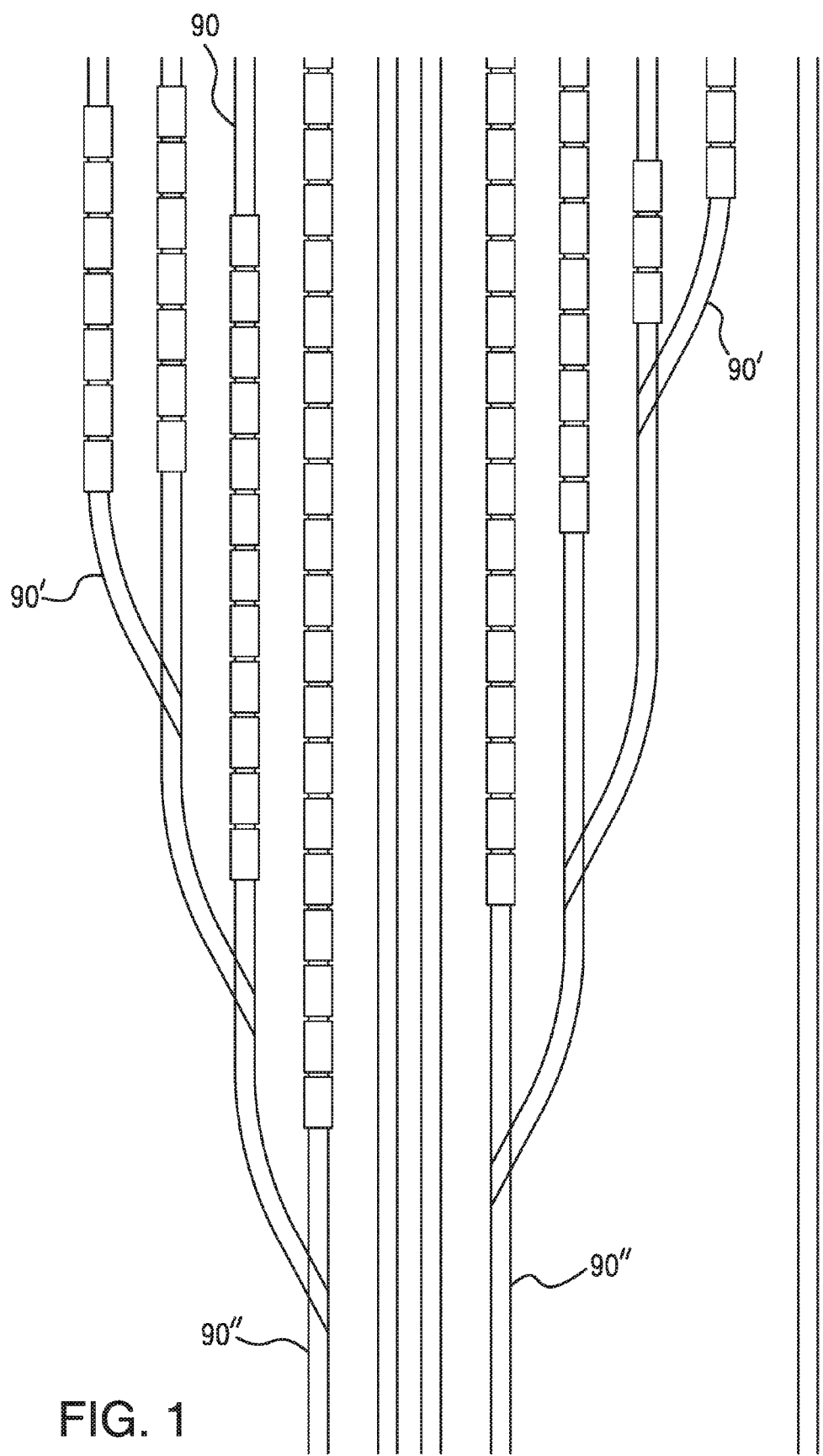
FIG. 1 is a schematic diagram shows an example layout of tracks in a rail yard showing ladder tracks branching off from a main line, illustrating strings of rail vehicles parked upon the various ladder tracks.

In broad concept, a system and method implemented in accordance with various embodiments of the present invention make use of several main units, including a mobile treatment unit equipped with a storage compartment and at least one sensor unit, and a control unit operably linked with the mobile treatment unit. A user may operate the control unit to maneuver the mobile treatment unit between selected track rails to treat the area between and around the track rails with the particular treatment material(s) carried by the mobile treatment unit. The mobile treatment unit is equipped with suitable traction for traversal over the track's rails and travel across the rail ties extending therebetween without loss of control or stability. It is configured for subvehicular access to the ground surfaces about rail tracks that may be occupied one or more rail vehicles. The mobile treatment unit may thereby be maneuvered beneath and beyond the occupying locomotive, train car, or other such rail vehicle for mobile treatment of the ground surfaces thereabout without interruption.

Using the subject system and method, a user may freely access and treat the area between and around multiple railroad tracks even in settings such occupied rail yards without having to first re-position the parked locomotives and/or railcars out of the way. The parked rail vehicles may remain in place while the mobile treatment unit passes underneath along the roadbed between the rails (and across the rail ties), unobstructed by the bottom parts of the vehicle body, chassis, and hardware which necessarily clear the roadbed between the rails. The system and method thus obviate the need for any engineers or other railroad workers to be present, let alone for them to operate the rail vehicles that may be occupying any rail track segment at the given site simply to make way for mobile treatment of the grounds for herbicide, weed control, and the like.

The mobile treatment unit is configured and dimensioned in accordance with certain aspects of the present invention such that it may freely pass underneath the railcars that remain in position on the tracks. It is configured for such subvehicular passage along an occupied rail track without having to actually travel on the track's rails themselves. Preferably, the mobile treatment unit is equipped with sufficient traction and propulsion measures that it may travel suitably across the railroad ties extending between parallel track rails. Moreover, each mobile treatment unit is preferably equipped with suitable traction and propulsion measures to turn and traverse individual track rails so that it may pass from one rail track segment to another and thereby effect treatment of the surface area surrounding all the track segments in a given rail yard or other site/facility.

Preferably, the remote control unit operated by a user is wirelessly linked to suitable transmit/receive measures provided on the mobile treatment unit. Through the wireless link, the remote control unit passes guidance and control and/or treatment control commands to which the mobile treatment unit and its payload (treatment material) carrying equipment respond. Also through such wireless link, the remote control unit preferably receives feedback data from the mobile treatment unit—such as real time photographic, video and/or other sensed data indicative of the conditions immediately surrounding the mobile treatment unit. In particular, photographic or video feedback from the mobile treatment unit would enable the user to safely guide the mobile treatment unit even if he/she loses line of sight visibility link with the mobile treatment unit during operation. This may be particularly important where large and densely occupied rail yards are to be treated in this manner, or where normal rail yard activity may be on-going during the treatment process.

Such photographic/video feedback may also be used to carry out visual inspection (or acquire inspection data) of the ground surface, rail track, or occupying rail vehicle as part of the mobile treatment unit's operation. Toward that end, illumination measures may be provided with photographic/video equipment to enhance the captured images.

In certain alternate embodiments, the remote control unit may be linked to the mobile treatment unit via a wired, or otherwise tethered, link. This may pose some obvious obstacles and therefore limit the applicability of the implemented system to only certain applications. The actual type of communication link employed between the remote control and mobile treatment units will depend upon the particular requirements and resources of the particularly intended application.

Amongst the practical advantages offered by the subject system and method is for an operator to carry out surface treatment of the grounds between and surrounding the given rail tracks without significantly hindering otherwise normal operation of the given rail yard or such other facility. While suitable precautions must be taken to avoid undue risk of collision or other mishap, a mobile treatment unit provided in accordance with the present invention is configured to be sufficiently unobtrusive to such normal rail yard operations. As mentioned, each mobile treatment unit is sized to clear the lowest point of any rail vehicle that may be occupying the rail track segments at a given site or facility. It is configured as well to avoid snagging or otherwise interfering with pipes, hoses, wires, harnesses or the like which may be suspended beneath the rail vehicle. Also, each mobile treatment unit is preferably equipped with traction measures that enable it to effectively travel transversely across railroad ties, climb transversely up, over, and across the track rails, and freely turn and reorient itself even when situated on the roadbed and ballast between the parallel track rails.

Turning now to FIG. 1, there is schematically illustrated an example of rail track segments 90 and occupying railcars 80 in a typical rail yard having a so-called "ladder" track layout whose grounds are to be treated. Visualizing the layout of the branched rail track segments shown within the rail yard, it can be appreciated that removing a string of rail cars from a track constitutes an inconvenient, time-consuming, and labor intensive process. Rail cars parked on the outermost ladder tracks 90', for example, cannot be driven/hauled straight out of the rail yard to permit conventional treatment of the grounds about those tracks 90'. Rather, they must be maneuvered onto adjacent track segments 90 by following the branched pattern of intersecting rails to make their way toward the more center rail track segments 90", or onto the main line tracks to have a path out of the rail yard. The need for such complicated maneuvering is eliminated by the subject system and method which in accordance with various exemplary embodiments of the present invention provides for mobile treatment of ground surfaces about a rail track while the rail cars or other occupying rail vehicles remain in place thereon. That is, the subject system and method provide for the mobile treatment of such occupied rail tracks without having to first clear the tracks of the occupying rail vehicles.

Figure 2:
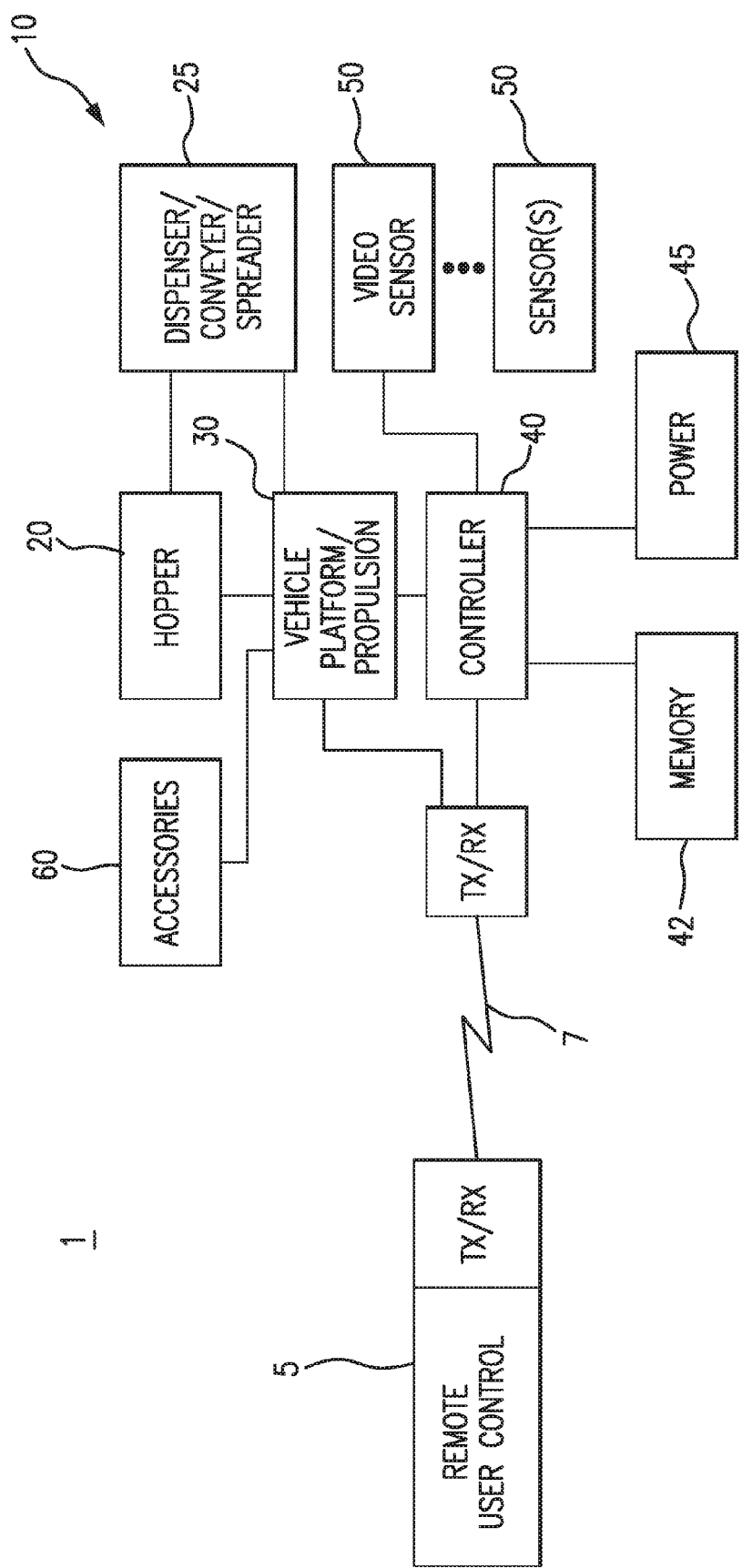
FIG. 2 is a schematic block diagram illustrating a system formed in accordance with an exemplary embodiment of the present invention.

Turning to FIG. 2, there is schematically illustrated a system 1 formed in accordance with one exemplary embodiment of the present invention. The system 1 generally includes a mobile treatment unit 10 remotely linked to a user control unit 5 for operation responsive thereto. The mobile treatment unit 10 is dimensioned to have an overall width that is less than the distance between opposing parallel rails of rail tracks it is to operate along, and an overall height that is less than a minimum clearance underneath the lowest sitting rail vehicle to be encountered. There is no specifically required width or height dimension for the mobile treatment unit 10; however, the unit 10 should be dimensioned to fit within the parallel rails and remain suitably maneuverable underneath an occupying rail vehicle so that the system 1 may effectuate mobile treatment along a rail track while the occupying vehicle or a string of such vehicles remain in position thereon.

As illustrated in FIG. 2, system 1 in this illustrative embodiment includes a remote user control unit 5 coupled via a suitable communications link 7 a mobile treatment unit 10. The mobile treatment unit 10 itself provides a mobile vehicle platform and propulsion mechanism 30, and is operable under the control of the remote user control unit 5 to move freely to and along the rail tracks whose surrounding grounds are to be treated. The mobile treatment unit 10 is preferably equipped with a controller 40 and a transceiver 15 through which the controller 40 communicates with the user control unit 5, to responsively actuate the mobile treatment unit's movement and other automated on-board functions. If more practicable in certain applications, the transceiver 15 may be operably coupled directly coupled to the vehicle platform and propulsion mechanism 30 as shown for control directly by the user control unit 5 (bypassing the on board controller 40 in this regard). The mobile treatment unit 10 is preferably also equipped with a plurality of sensors 50, such as a photographic or video camera, for capturing and providing sensory feedback to the user control unit 5. The mobile treatment unit 10 is further equipped with a hopper 20 and various accessories 60 (such as shielding measures, bumper structure, or the like) suitable for the particularly intended application.

The hopper 20 carries the mobile treatment unit's primary payload, namely the treatment material to be dispensed once the unit 10 is in place for treatment operation. The hopper 20 is preferably served by a dispensing mechanism 25 of suitable type, also provided on the mobile treatment unit 10, which projects the treatment material with suitable reach of the ground surfaces about the given rail track at a suitable treatment rate. Depending on the properties of the treatment material, the type of treatment to be done, and other such application specific factors, the dispensing mechanism may include a conveyer, spreader, and other such structural features appropriate for the intended application.

The treatment material may be in any suitable state such as liquid or solid depending again on the prevailing conditions and factors. Where the treatment material is in granular solid form, for instance, a carousel-like rotary spreader may be employed in the dispenser 25 to receive then cast out the treatment material as it is dropped from the hopper 20. As described in following paragraphs for certain embodiments, the process may be facilitated by a hopper 20 shape that funnels or otherwise urges granular treatment material towards the dispenser relying primarily on gravity-assist and natural agitation by the mobile treatment unit's movements over an uneven roadbed surface. In certain other embodiments, the process may be more actively facilitated by a power driven conveyor system or auger assembly that carries portions of the treatment material to deliver the same onto the dispenser 25. Where the treatment material is of liquid form, the dispenser 25 may include suitable pump assembly and conduit system to deliver the material from liquid-sealed containment in the hopper 20 to a spray nozzle for sprayed expulsion therefrom.

The mobile treatment unit 10 additionally includes a power source 45 of any suitable type(s) known in the art to drive its propulsion and on board operational functions like treatment material dispensing, sensor/accessory energization, and communications. This may be in the form of a power storing battery unit and/or a fueled generator system. In all electric embodiments, power for all on-board operations may be derived from a common battery pack. In gasoline or other fuel powered applications, the vehicle propulsion mechanism may be driven by a fuel powered combustion engine, while the other on-board functions may be driven by electric power electromechanically transduced therefrom.

The mobile treatment unit is preferably equipped with a memory device 42 which may be incorporated with the controller 40, or provided externally as an adjunct storage medium. The memory device 42 provides the storage necessary to save data necessary for programmable operation of the controller 40, command and control data received from the user control unit 5, rail yard layout and other such archived operational data, image and other acquisition data captured by on-board sensor 50 and accessory 60 measures, and the like.

During operation, the on-board controller 40 directs the mobile treatment unit 10 to maneuver to and between the rails of the given rail track segment for treatment of the area between and in the surrounding vicinity of those track rails responsive to various command and control data transmitted by the unit 5 and received via the transceiver 15. As mentioned in preceding paragraphs, the mobile treatment unit's propulsion and directional guidance may be controlled directly by the user control unit 5 via direct coupling to the vehicle platform and propulsion mechanism 30 (and any steering linkages therefor) through the transceiver 15. Responsive to further control commands, the mobile treatment unit 10 is advanced along the rail track segment, between its rails. As shown, the user control unit 5 is operably linked to the mobile treatment unit preferably via a wireless communications link 7 to direct the propulsion and on-board functions of the mobile treatment unit 10 as it travels along the rail track segment. In alternate embodiments, where operational conditions permit, the remotely disposed user control unit 5 may be tethered to the mobile treatment unit 10 for passage of data therebetween.

One or more sensors 50 are preferably provided on the mobile treatment unit 10 to provide local sensory feedback to the remotely operated user control unit 5. For example, information about: the position and orientation of the mobile treatment unit 10, the given rail track, surrounding ground areas, and any rail-occupying vehicle which may be proximately positioned. Preferably, each of the on-board sensors 50 is operably linked to the control unit 5 typically via the controller 40, such that the feedback information it provides (such as on-board video) may aid the user in real time guidance and control of the mobile treatment unit 10 and its on-board operational functions. As the mobile treatment unit 10 is controlled to maneuver along a rail track according to maneuver control commands from the control unit 5, the environmental data acquired by the sensors 50 aids the user to appropriately command treatment material dispensing. For example, one or more video sensors 50 may be employed to collect visual data to be received by the user via a video display screen on the remote user control unit 5. Such data enables the user to selectively control the mobile treatment unit 10 to modify its propulsion direction in response to the visualized position and orientation of the mobile treatment unit 10 with respect to the rail track and thereby avoid collision with the inner sides of the track rails. In certain embodiments, one or more proximity sensors 50 may be provided on the vehicle platform 30 at or near its propulsion mechanism to capture data indicating the orientation of the mobile treatment unit 10 and its position relative to a nearby barrier such as a track rail, and send to the on-board controller 40 for collision avoidance/automatic guidance processing. The controller 40 may then effect an automatic piloting function by responsively adjusting the vehicle propulsion mechanism (and its steering control portions) to keep the mobile treatment unit 10 safely situated substantially parallel to the rail and directed properly along the rail track.

Additionally, the sensors 50 help with regard to detecting any obstructions such as debris that may have fallen onto the railroad track. Upon receiving such information, a user may take evasive action, guiding the mobile treatment unit 10 around the obstruction or even altogether stop the mobile treatment unit 10 so that the obstruction may be cleared before continuing the mobile treatment process along the rail track.

Figure 2A:
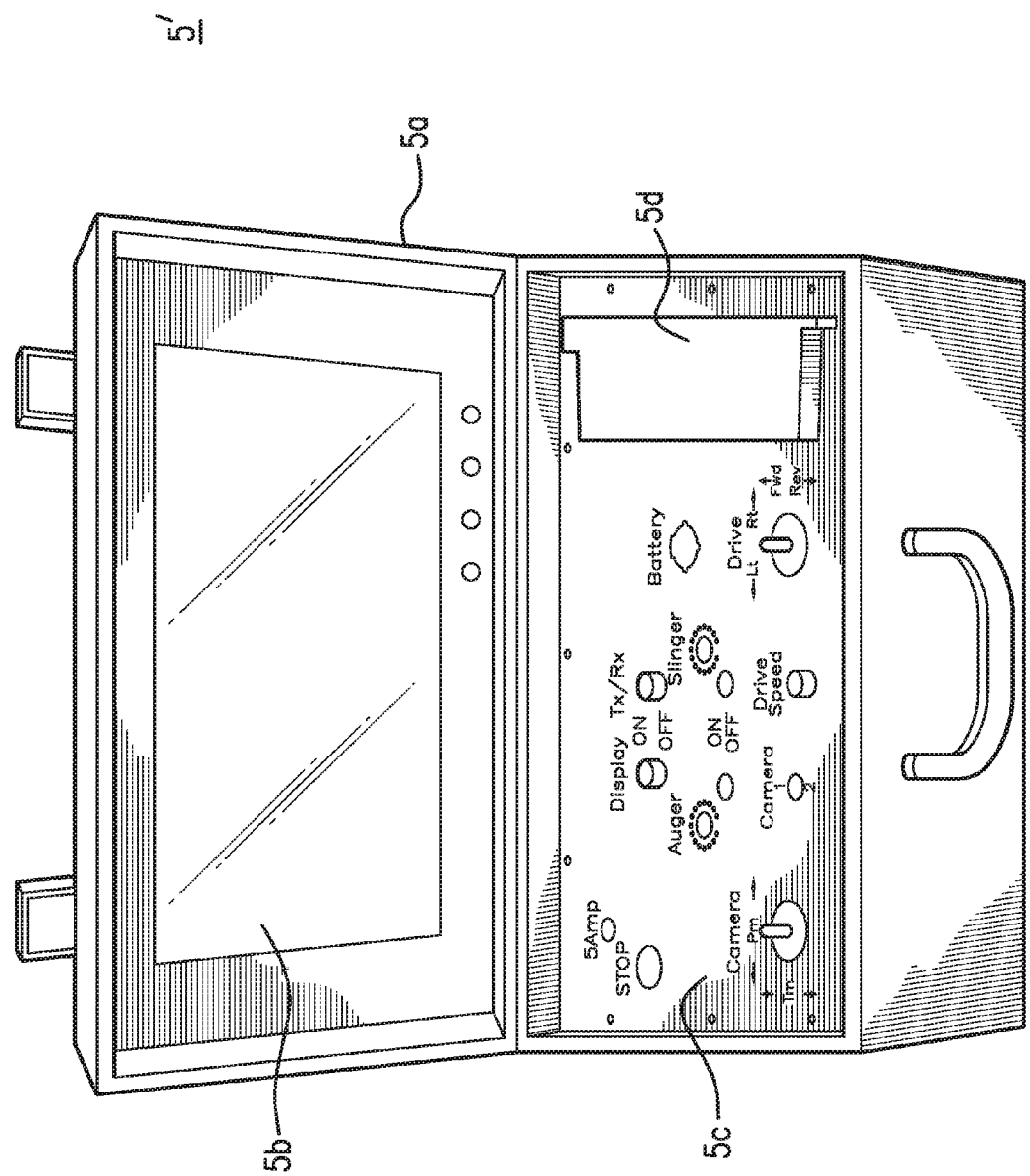
FIG. 2*a* is a perspective view of a control unit implemented in accordance with an exemplary embodiment of the present invention for use in the system illustrated in FIG. 2.

Turning now to FIG. 2*a*, there is shown a perspective view of a remote user control unit 5' formed in accordance with one exemplary embodiment of the present invention. This is but one of numerous ways that unit 5 may be implemented. In the illustrated example, the remote user control unit 5' is conveniently packaged in a case 5*a* which may be opened for use to provide a readily viewable display 5*b* and a control panel 5*c*. In this embodiment, an auxiliary battery pack 5*c* is stored in the case 5*a* for available use as a quick change spare should a comparable battery pack provided on the mobile treatment unit 10 to power its operation fail or discharge during use in the field. In certain embodiments, the auxiliary battery pack 5*c* may be docked for charging within the case 5*a*, with the unit 5' including a suitable power supply and connector (not shown) for interconnection to an external AC (alternating current) or other external power source.

The display 5*b* may be of liquid crystal display (LCD) or any other suitable type known in the art sufficient to render photographic and video images captured from one or more sensors on board the mobile treatment unit 10. The control panel 5*c* includes processing and transceiver measures of any suitable type known in the art to enable a user to actuate and adjust the various operational functions of the mobile treatment unit 10. As shown, the control panel 5*c* includes a faceplate indicating a variety of operational functions to be controlled thereby, including such functions as drive direction and speed, video camera select, pan, and tilt/turn, auger on/off, dispensing slinger on/off, and display controls.

Turning next to FIGS. 3-6, a mobile treatment unit 100 formed in accordance with a first exemplary embodiment of the present invention is illustrated. The mobile treatment unit 100 includes a hopper or other suitably configured storage compartment 120 that is provided on a vehicle platform/chassis carried by a vehicle propulsion mechanism 130. The vehicle propulsion mechanism 130 preferably includes a pair of power driven wheel sets supporting laterally opposed sides of the vehicle chassis, and an on board electric motor, fuel burning combustion engine, or other suitable power plant for driving the same. The requisite power plant, controlling electronics, and communications hardware incorporated in the mobile treatment unit 100 for its propulsion and guidance responsive to the remote user control unit 5 may be of any suitable type known in the art, and are not shown in FIGS. 3-6 to preserve clarity.

The mobile treatment unit 100 preferably includes a powered dispenser 125 having a rotary spreader wheel 152 situated at an outlet 122 of the hopper 120 for evenly distributing the treatment material as it is released from the hopper outlet 122. The hopper 120 in this embodiment is configured to store and gradually release a granular solid treatment material through the outlet 122. The hopper 120 is equipped with a retractable gate 124 that operates much like an articulated garage door to roll in and out of obstructive position before the outlet 122 (gate 124 shown closed in FIG. 3, partially open in FIG. 5). The rate of treatment material release from the hopper 120 (through the outlet 122) may be regulated by accordingly controlling the position of this door 124 relative to the outlet 122. The more of the outlet 122 the door 124 obstructs, the slower the rate of treatment material release, and the less of the outlet 122 it obstructs, the faster the rate of release.

The powered dispenser 125 includes a motor 153 which drives the rotary spreader wheel 152 via suitable linkages 153*a* to rotate via a drive shaft 151. These power driving components, their arrangement, and their interconnection are but one example of many known in the art which may be employed, and are explicitly shown merely for purposes of illustration. Because the rotary spreader wheel 152 and other components of the dispenser 125 in this embodiment are suspended in outboard manner from the vehicle frame/chassis of unit 100, it would be vulnerably exposed to harmful contact/impact from below, especially as the mobile treatment unit 100 transversely climbs up and over a track rail. The mobile treatment unit 100 is therefore preferably equipped with a protective plate 160 preferably of metal or other material of comparable shielding strength and rigidity which extends from the chassis beneath the otherwise exposed spreader 152. This protective plate 160 shields the dispenser 125 components from harmful impact with obstacles traversed by the mobile treatment unit 100 or debris that it may kick up during operation. The protective plate 160 also serves to deflect out of the way weeds or other roadbed growth which may otherwise pose snagging hazards to the moving components of the dispenser 125.

In the embodiment illustrated, each wheel set 131 positioned along one lateral side of the chassis is enveloped by a continuous tread member 132 preferably of the so-called tank tread or caterpillar track type. The continuous tread 132 at either side of the mobile treatment unit 100 is independently driven (in rate and direction of movement) via its wheel set 131 to effect the required steering. This embodiment employs a plurality of primary wheel members 131*a* of substantially even configuration distributed in longitudinal alignment along the length of the chassis, and a secondary wheel member 131*b* offset from alignment therewith as shown. The continuous tread 132 is fitted over the combined set of wheel members 131*a*, 131*b* to be driven thereby through an endlessly looped for advancing the mobile treatment unit 100 over the surface underneath. The outer surfaces of the continuous tread 132 are equipped with suitable treading to provide sufficient gripping traction over the given surface of travel. The secondary wheel member 131*b* is disposed relative to the aligned primary wheel members 131*a* to pivot a portion the continuous tread's looped path upward about a rotatable pivot member 133. This gives the continuous tread 132 a ramped or upturned end profile which aids initial engagement of a track rail or other raised obstacle which the mobile treatment unit 100 encounters and must traverse.

The features of the propulsion mechanism 130 shown in this embodiment are for illustrative purposes only, and the mobile treatment unit 100 may employ any other propulsion mechanism known in the art capable of effectuating forward and/or reverse movement along a length of a rail track. For examples, the number of wheel members 131, their size and configuration, as well as their relative positioning may be varied based upon the particular needs and requirements of the intended application. Furthermore, the pivoting upward of the continuous tread 132 loop where it extends past the front of the unit chassis provides a level of stability to the mobile treatment unit 100, especially as it maneuvers to reposition itself from one rail track segment to another. The upturned front portion of the continuous tread 132 would lead the transverse engagement of an intervening track rail that the unit 100 must cross over to exit the given rail track segment and travel to the next. The upturned treading presented by this front portion provides a ramped engagement of the intervening track rail which immediately orients the unit 100 upward, enabling the front of the unit's chassis to readily clear the track rail. While this continuous tread 132 profile (illustrated in FIG. 3) offers a number of advantages, the mobile treatment unit 100 is not limited to such particular profile and may be varied in configuration depending on the requirements of a given application.

FIGS. 3a and 3b illustrate examples of various other continuous tread profiles that may be employed in certain alternate embodiments of the mobile treatment unit 100a, 100b. In the embodiment of FIG. 3a, the continuous tread 132a is coupled over the wheel set at each lateral side of the mobile treatment unit 100a without a pivot, yet describes an upturned front portion as shown to provide the ramped treading lead engagement of a raised obstacle as in the embodiment of FIG. 3. This structural configuration may be desirable as it simplifies the continuous tread's endlessly looped path of travel about the wheel set. Alternatively, in the embodiment of FIG. 3b, the continuous tread 132b is coupled over a longitudinally in-line wheel set at each lateral side of the mobile treatment unit 100b, such that it simply describes a longitudinally extended tread loop. While such configuration preserves structural simplicity, careful adjustment of the tread loop's length and frontal extension beyond the unit chassis must be made depending on the particularly intended application to avoid obstructive interference when transversely clearing a track rail.

Preferably, the chassis and components forming the body of the mobile treatment unit 100, 100a, 100b is formed of metal, hard plastic, composite, or other suitable material of comparable strength and rigidity to durably withstand the constant vibratory agitation and frequent impact that the unit is likely to encounter in connection with typical treatment operations. The wheel members 131 and continuous tread 132 may be formed of any suitable material known in the art to provide the desired combination of traction and durability for the conditions to be encountered in the in the particularly intended application.

Referring back to the exemplary embodiment of FIG. 3, the hopper or storage compartment 120 is preferably coupled in detachable manner to the mobile treatment unit's chassis by one or more attachment pins AP. Attachment pins AP may be removed or released allow for convenient removal of the hopper 120, so that it may be filled and/or emptied off-line, and cleaned or modularly replaced as necessary after use. In alternate embodiments, the hopper 120 may be detachably coupled by other measures known in the art, or may otherwise be integrally formed with the unit's chassis as a fixed part thereof.

Alternatively, the hopper/storage compartment 20 may be fed during treatment from a remotely disposed source of treatment material. The hopper/storage compartment 120 may itself be remotely from the mobile treatment unit 100, with simply the dispenser 125 being provided on-board for expelling the treatment material as it is fed from the remote compartment 120. For example, a hose or other conduit mechanism may link the mobile treatment unit 100 to an off-board hopper or storage compartment 120, to convey the treatment material therebetween during the treatment for distribution by the on board dispenser 125.

As described in preceding paragraphs, the storage compartment 120 in the illustrated embodiment is adapted for storing and gradually releasing a solid treatment material, preferably in a spreadable granular or particulate form. The storage compartment 120 in this embodiment is configured with sloped, inclined floor surface portions 120a, 120b, which urge the stored treatment material downward. This along with the natural agitation invariably resulting from the mobile treatment unit's bumpy travel over a rail track's roadbed causes the particulate treatment material to gravitationally migrate downward through the storage compartment 120 to its outlet 122. As the material is released through the outlet 122, it is flung by the rotating action of the spreader 152 to radiate outward onto the surrounding ground surfaces.

In certain alternate embodiments, the storage compartment may employ more active measures for efficient release of treatment material therefrom. In addition to incorporating power-driven conveyor and/or auger assemblies described following paragraphs, the storage compartment may be defined by a revolving mixer type mechanism configured to operate much in the manner of a powered cement mixer. A wide variety of hopper/storage compartment features may be implemented for the mobile treatment unit 100 to the extent permitted by the resources available in the intended application and the dimensional constraints of unhindered subvehicular mobility within the confines of an occupied rail track segment.

As the mobile treatment unit 100 is propelled along the rail tracks, it is actuated in the illustrated embodiment to spread the treatment material released from the hopper/storage compartment 120 in a rearward fanned out pattern. If the mobile treatment unit 100 is travelling with ample speed, such fanned out rearward spreading pattern is efficiently left in the travelling unit's wake. On the other hand, if the mobile treatment unit 100 is travelling too slowly (relative to the dispensing flow rate and/or rotary spreader rotation rate), or if the mobile treatment unit 100 is travelling in reverse direction as it is spreading, the spreading may not only be disrupted in efficiency, the rotary spreader may actually fling some of the treatment material back towards the unit 100 itself. Accordingly, a suitably shaped and sized deflector wall 161 may be incorporated for instance about a portion of the dispenser 125, such as illustrated in FIG. 4. The deflector wall 161 would serve to ensure that most if not all of the dispensed treatment material remains directed aft of the mobile treatment unit 10. This minimizes waste of the treatment material and minimizes the frequency with which the storage compartment 20 must be replenished. In the illustrated example, the deflector wall 161 is formed with an arcuately shaped contour corresponding to the rotary profile of the spreader 152, and disposed forward of that spreader 152. In alternate embodiments where it is employed, the deflector wall 161 may be variously configured and situated to optimally assist the efficient dispensing of treatment material onto the surrounding ground surfaces.

The top plan view and rear elevational view of the mobile treatment unit 100 shown in FIGS. 4-5 illustrates the bilaterally position and orientation of the continuous treads 132. Each of the continuously looped tread 132 is preferably disposed in a substantially even plane. As shown, the pivot members 133 for the continuous treads 132 are laterally aligned, such that the upwardly angled portions of the bilateral continuous treads 132 remain laterally aligned for convenient coordinated control in propelling and steering the mobile treatment unit 100.

Figure 6:
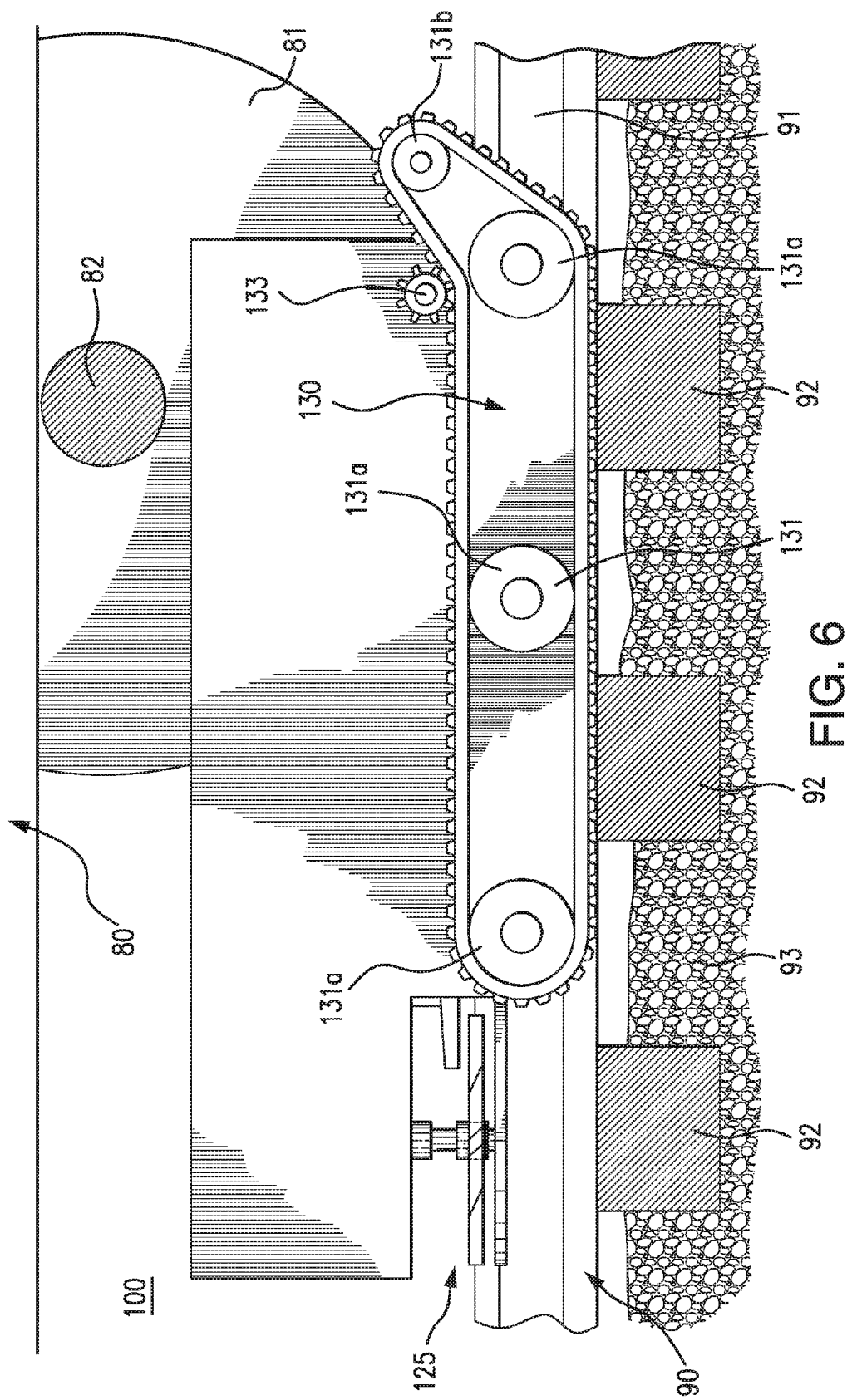
FIG. 6 is a side elevational view of the mobile treatment unit embodiment of FIG. 3, illustrating subvehicular access to a rail track occupied by a rail vehicle.

Turning now to FIG. 6, the mobile treatment unit 100 is shown during a treatment process. In accordance with certain aspects of the present invention, the mobile treatment unit 100 is configured for subvehicular passage under a rail vehicle 80 which may be occupying the rail track segment at hand. To do so, the mobile treatment unit 100 must travel over the roadbed between the parallel rails 91 of the given track segment. The roadbed here typically constitutes a stony ballast surface 93 (of crushed stone material or the like) on which an ongoing series of rail ties 92 are disposed cross-extending between the rails 91, such that a ledged drop-off surface discontinuity occurs at the junction of most rail ties 92 and the stony ballast areas 93. The mobile treatment unit 100 is accordingly dimensioned to maintain sufficient clearance underneath the occupying rail vehicle 80 to pass and maneuver unhindered therebeneath. Moreover, mobile treatment unit 100 is equipped with a vehicle propulsion mechanism 130 whose wheel sets 131 and/or continuous treads 132 are each configured to continually cross-traverse the interspersed rail ties 92 without loss of stability and control. Toward that end, the longitudinally extended portion of each continuous tread 132 in this embodiment is preferably configured to maintain contact with at least two neighboring rail ties 92 when travelling transversely thereover. In those embodiments where the wheel sets 131 may not be wrapped by continuous treads 132, the lowermost individual wheel members 131a within that wheel set 131 are preferably sized and mutually arranged such that one or more wheel members 131a collectively maintain contact with at least two neighboring rail ties 92 when travelling transversely thereover.

The mobile treatment unit 10 is also dimensioned in width to be accommodated between the opposing parallel rails 91 of the rail track 90. The mobile treatment unit 10 is dimensioned in height to remain safely clear of the occupying rail vehicle's axle 82 extending between its bilateral track wheels 81. As its axles 82 typically define the lowest portion of a rail vehicle 80, the mobile treatment unit 10 should be dimensioned in height to maintain safe clearance underneath such axle 82 of rail vehicles to be encountered in the particularly intended application.

Figure 16A:
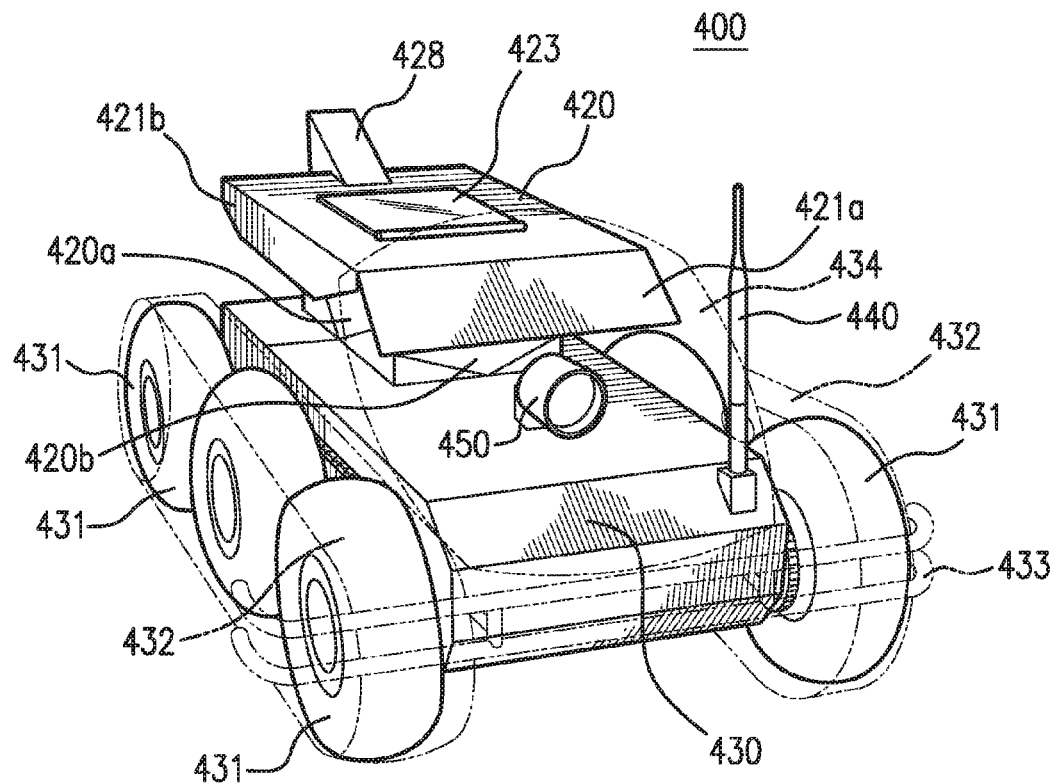
FIG. 16A is a front perspective view of a mobile treatment unit formed in accordance with yet another exemplary embodiment of the present invention for use in the system illustrated in FIG. 2.
Figures 16B, 16C:
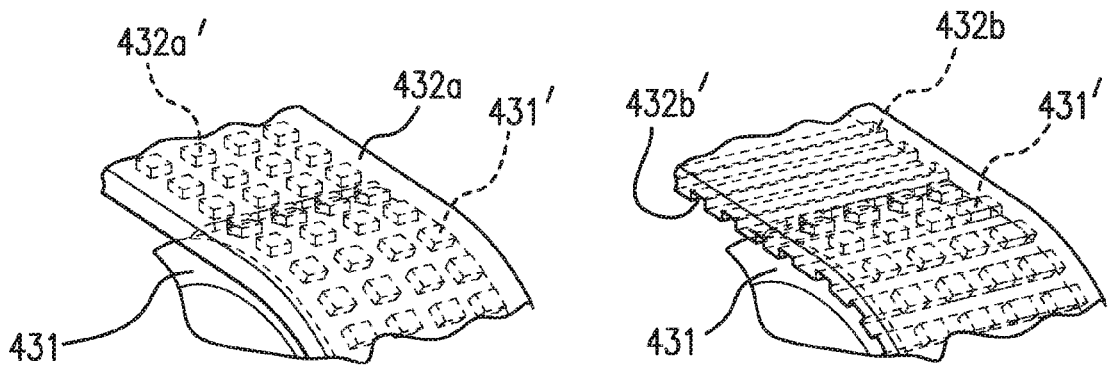
FIG. 16B is a perspective view, partially cut away, of a variation on a portion of the mobile treatment unit embodiment of FIG. 16A.
FIG. 16C is a perspective view, partially cut away, of another variation on a portion of the mobile treatment unit embodiment of FIG. 16A.

Additionally, it is not uncommon for pipes, hoses, wires, harnesses or the like to hang downward from the bottom of a rail vehicle. These hanging obstructions may pose a snagging or other interference hazard to a mobile treatment unit 100 passing underneath. To avoid entanglement with these hanging obstructions, the mobile treatment unit 100 may be further refined in dimension and imbued with suitable body shapes and features to resist as much. In addition, the mobile treatment unit 100 may be equipped in certain embodiments with a shield or canopy (such as illustrated in FIG. 16a) to deflect the obstruction out of the way as the unit travels past them.

Configured and equipped as it is to travel between the track rails themselves, the mobile treatment unit 100 preferably rides on a wheel set 131 and/or continuous tread 132 which spans two or more rail ties 92 at all times during such travel, as mentioned in preceding paragraphs. This, however, is not necessarily a requirement for proper treatment operation. The mobile treatment unit 100 in alternate embodiments for instance may be equipped instead with sufficiently active and adaptive suspension measures to effect compensatory attenuation of the vibratory/jarring impact due to the surface discontinuities in the roadbed. In certain other alternate embodiments, the mobile treatment unit 100 may be equipped with a vehicle propulsion mechanism which does not rely on surface contact. For example, suspended propulsion means like hover-based propulsion may be employed where the resources and requirements in a particularly intended application permit. Still further, the rail tracks in question may be of such structure that the discontinuities between rail ties or other components in the roadbed between track rails is substantially negligible, and spanning adjacent rail ties with the unit's wheel members and/or continuous tread not necessary.

To effectuate treatment of the area surrounding the parallel rails 91 of a given rail track segment, including the area therebetween, the mobile treatment unit 100 employs a rotary spreader-based dispenser 125 in the embodiment shown. Dispenser assemblies of any other suitable type and construction known in the art may be employed in alternate embodiments. It is preferable, however, for operational simplicity to position the dispenser 125 in pertinent part near or above the uppermost extent of the track rails 91. This is to facilitate the dispensed treatment material's reach to surface areas laterally beyond the parallel rails, including the normally regulated 'right of way' (easement) regions immediately buffering the rail tracks which railway operators are typically obligated to safely maintain.

Figure 7:
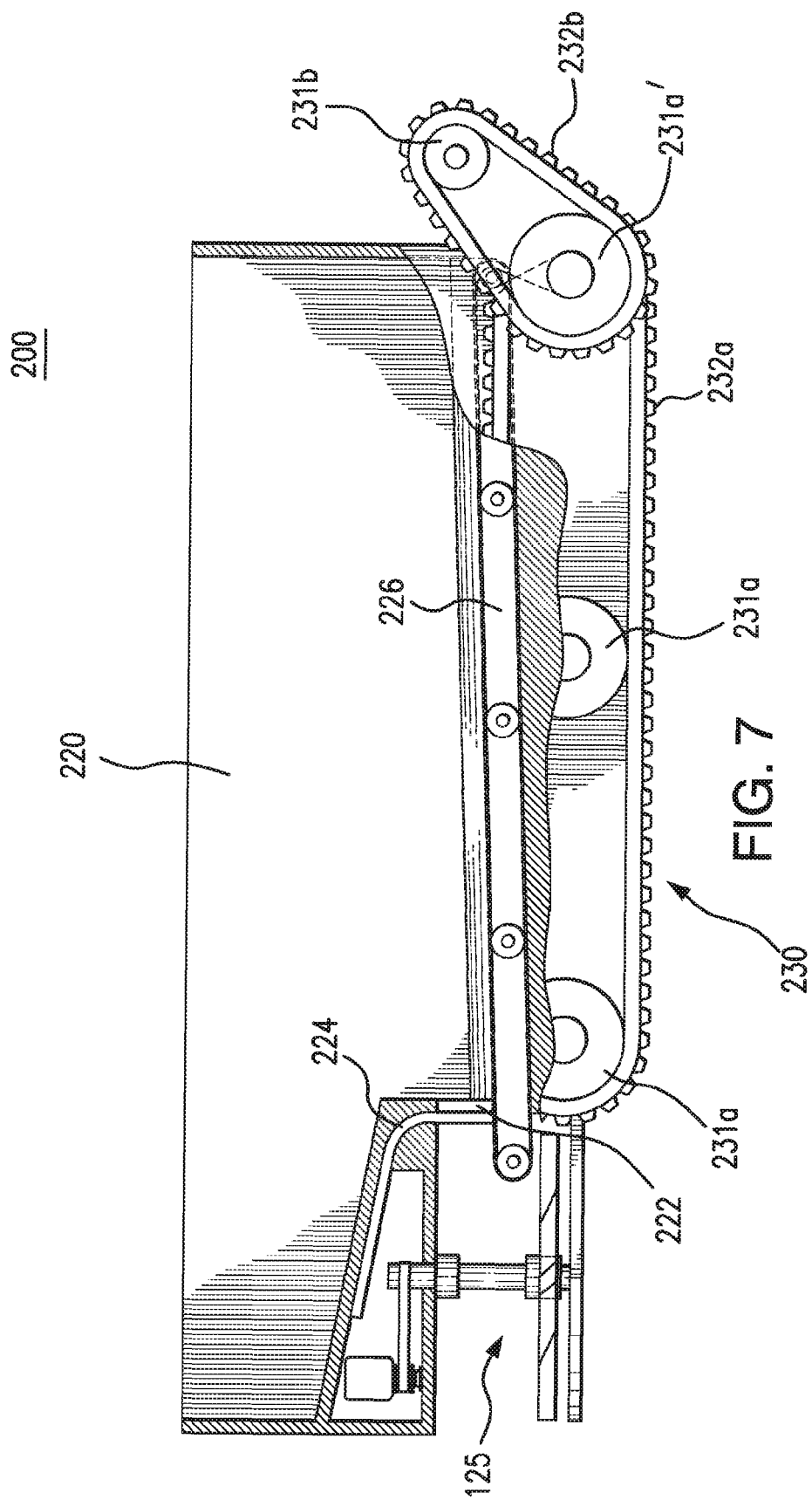
FIG. 7 is a side elevational view, partially cut away, of a mobile treatment unit formed in accordance with another exemplary embodiment of the present invention for use in the system illustrated in FIG. 2, in a storing configuration.
Figure 8:
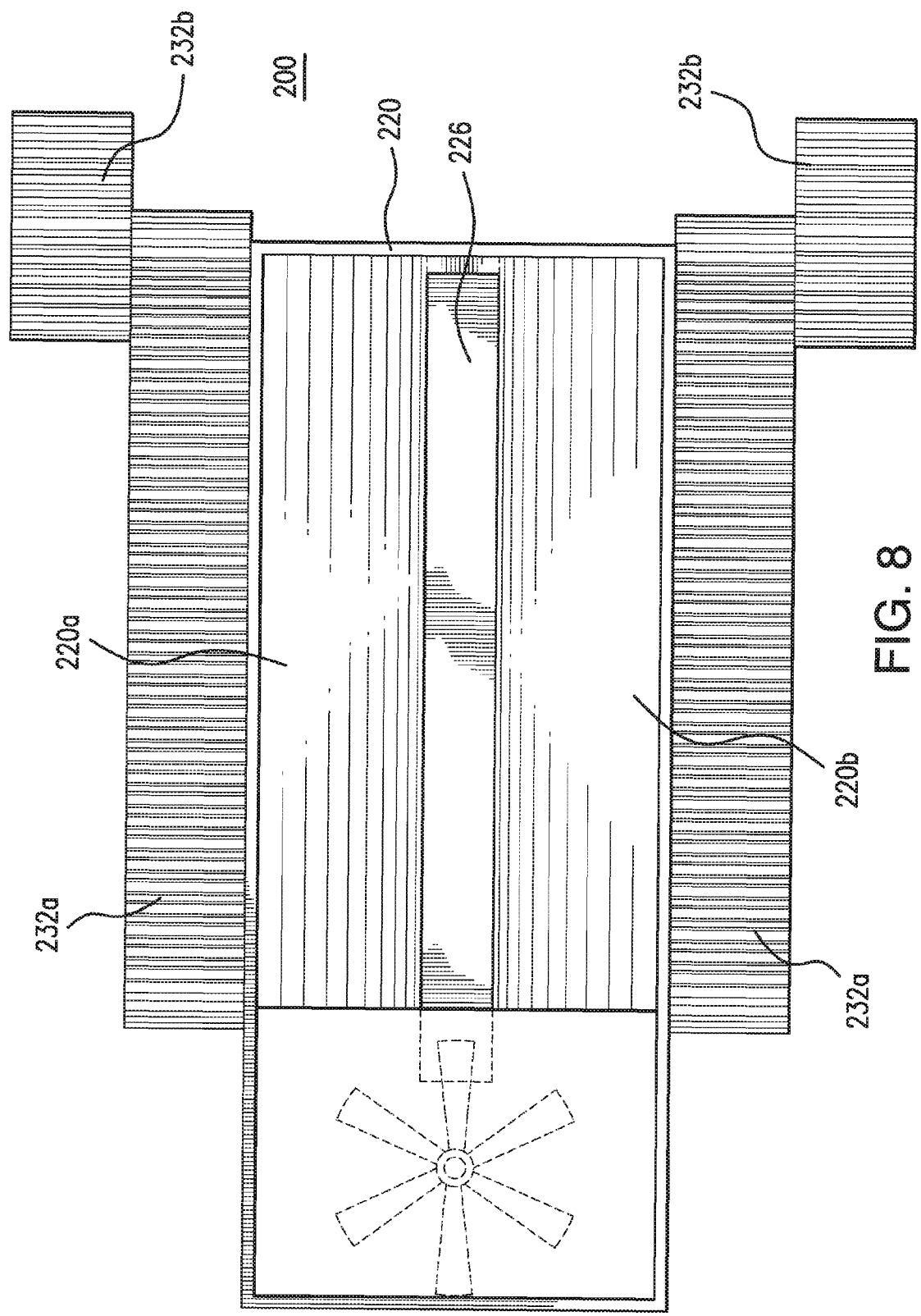
FIG. 8 is a plan view of the mobile treatment unit embodiment of FIG. 7.
Figure 9:
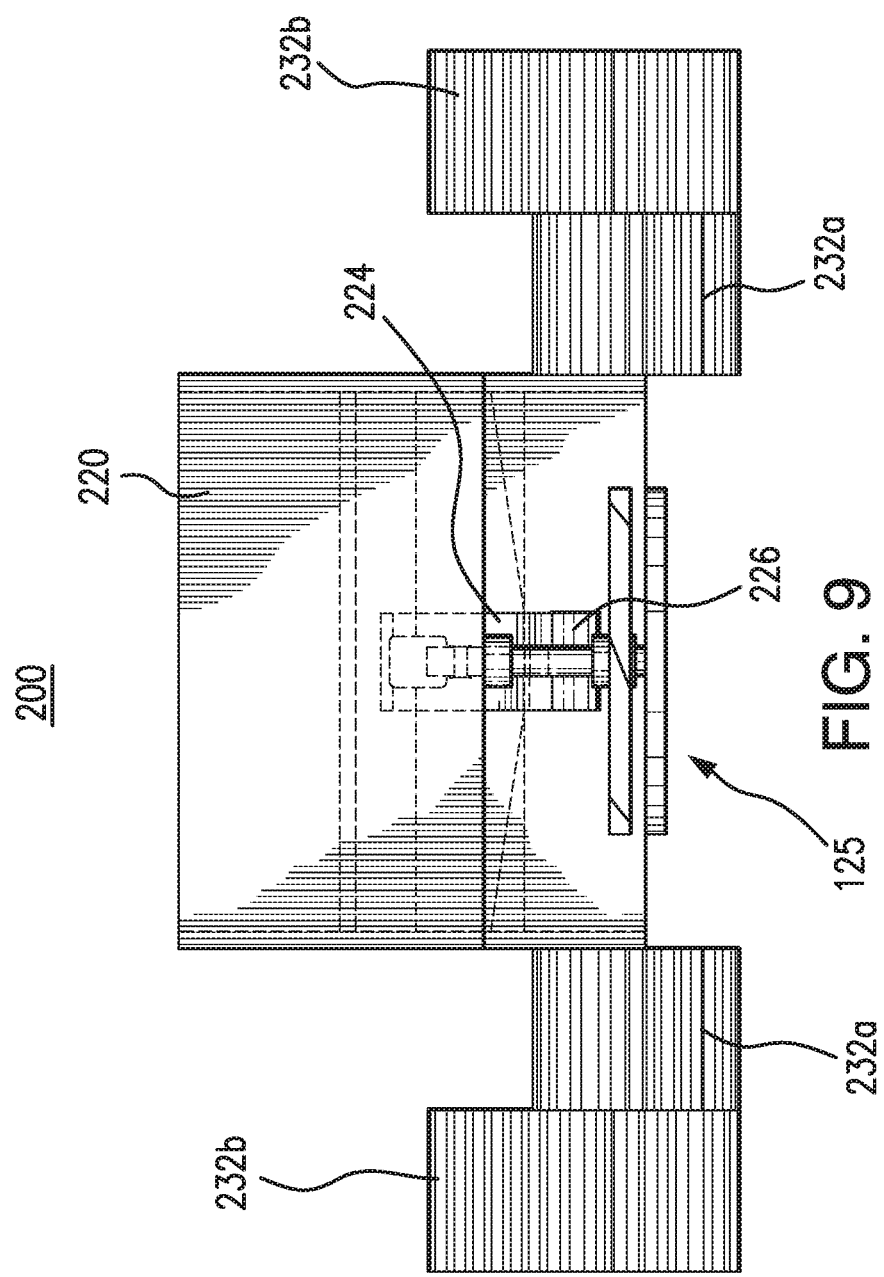
FIG. 9 is a rear elevational view of the mobile treatment unit embodiment of FIG. 7.

A mobile treatment unit 200 formed in accordance with another exemplary embodiment of the present invention is illustrated in FIGS. 7-9. In this and other embodiments, structurally equivalent components are indicated by the same reference numbers as those described in the first exemplary embodiment of FIGS. 3 and 4-6.

In this embodiment, a mobile treatment unit 200 includes a vehicle propulsion mechanism 230 having at each lateral side thereof a plurality of wheel sets respectively driving a plurality of continuous treads 232a, 232b. Further, in this embodiment, the mobile treatment unit 200 employs a hopper/storage compartment 220 incorporating a conveyor assembly 226 therein to transport the treatment material from inside the storage compartment 20 to its outlet 222 and on through to the dispenser 125. To facilitate movement of treatment material onto the conveyor assembly 226, the storage compartment 220 is formed with banked floor surface portions 220a, 220b sloped downward at opposing sides of the conveyor assembly 226 along its length. The banked floor surface portions 220a, 220b are each sloped at a suitable angle to collectively form a trough structure urging the treatment material in gravity-fed down towards the conveyor during operation.

Figure 10:
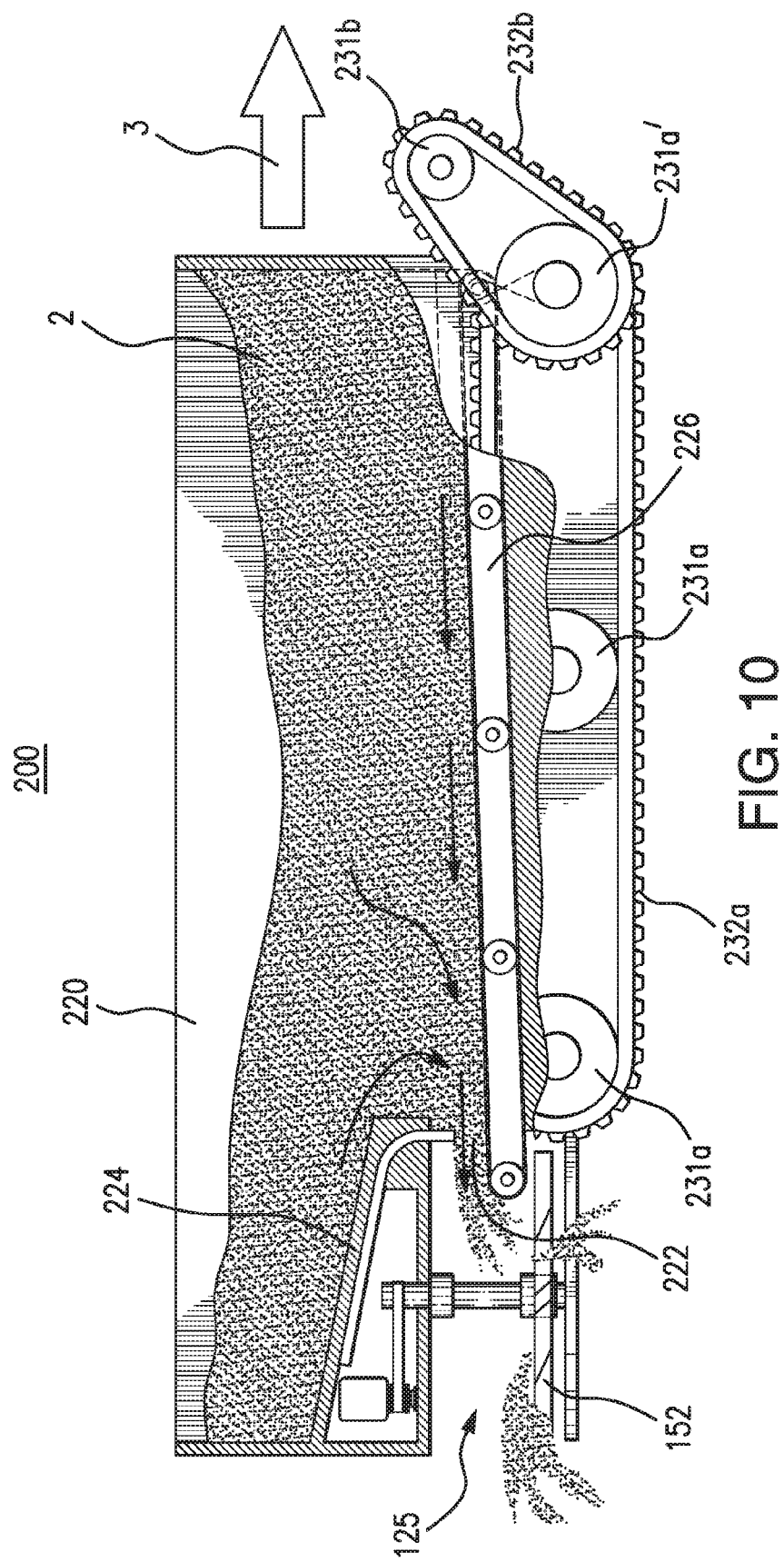
FIG. 10 is a side elevational view, partially cut away, of the mobile treatment unit embodiment of FIG. 7, illustrating operation in a dispensing configuration.
Figure 11:
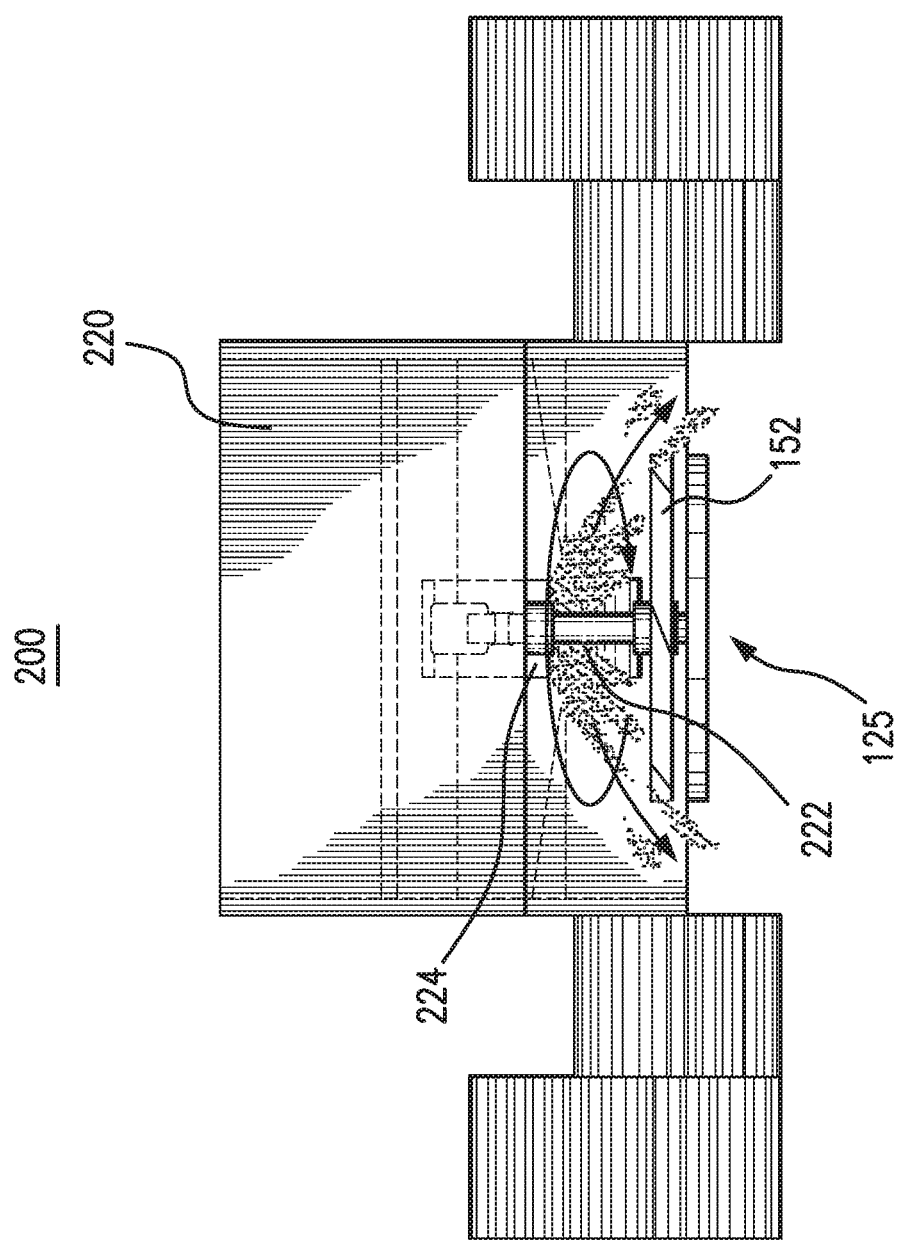
FIG. 11 is a rear elevational view of the mobile treatment unit embodiment of FIG. 7, illustrating operation in a dispensing configuration.

When treatment material is to be simply held in the storage compartment 220, a retractable door/gate 124 is drawn down to block the outlet 222 and thereby prevent release of the treatment material from the storage compartment 220. When the material is to be dispensed during a treatment operation, the gate 224 may be selectively opened to permit release of the treatment material through outlet 222. The rate of release may as in the first exemplary embodiment be controlled by controlling the degree to which gate 224 is left obstructing the outlet 222. In FIGS. 7 and 9, the gate 224 is shown in a fully closed position over the outlet 222. In FIGS. 10 and 11, the gate 224 is shown retracted to a partially open position over the outlet 222, permitting the release of treatment material 2 therethrough. As illustrated in FIG. 10, the treatment material 2 released from the storage compartment 220 is carried by the conveyor assembly 226 beyond the outlet 222 and dropped onto the spreader of dispenser 125 to be flung outward thereby.

Referring to the plan view of the mobile treatment unit 200 shown in FIG. 8, the conveyor assembly 226 is arranged to run centrally through the storage compartment 220. This invariably consumes a not-insignificant portion of the storage compartment's volume otherwise available to hold more treatment material. The combination of gravity feed efficacy and volumetric capacity may be optimized for different applications using various other suitable configurations and arrangements for the conveyor assembly 226. For example, the conveyor assembly 226 may be offset from center in certain alternate embodiments to one side of the storage compartment 220, with the surrounding surface portions of the storage compartment 220 configured accordingly.

The mobile treatment unit 200 in the illustrative embodiment shown employs multiple continuous tread segments 232a, 232b at each of its lateral sides, with the first and second segments 232a, 232b sharing a common drive wheel member 231a'. The dual, offset tread segments 232a' provides added stability and ruggedness which may be required for certain applications, since each tread segment need not bend about a pivot nor coordinate an elaborate arrangement of drive wheel members to accommodate an irregular loop shape. Still, the lateral offset between the multiple segments expands the mobile treatment unit's width which may restrict its maneuverability within the confines of a track's parallel rails.

FIGS. 10-11 illustrate operation of the mobile treatment unit 200 during treatment. As the mobile treatment unit 200 travels along the rail track in a direction 3, the treatment material 2 in the storage compartment 220 is bilaterally funneled down its banked floor surfaces onto the conveyor assembly 226 and carried thereby out through the outlet 222. The treatment material 2 is dropped by the conveyor assembly 226 onto the dispenser 125, whose rotary spreader wheel 152 then throws the material 2 rearward to cover the ground surfaces about the rail track in a fanned out, radiating pattern.

Figure 12:
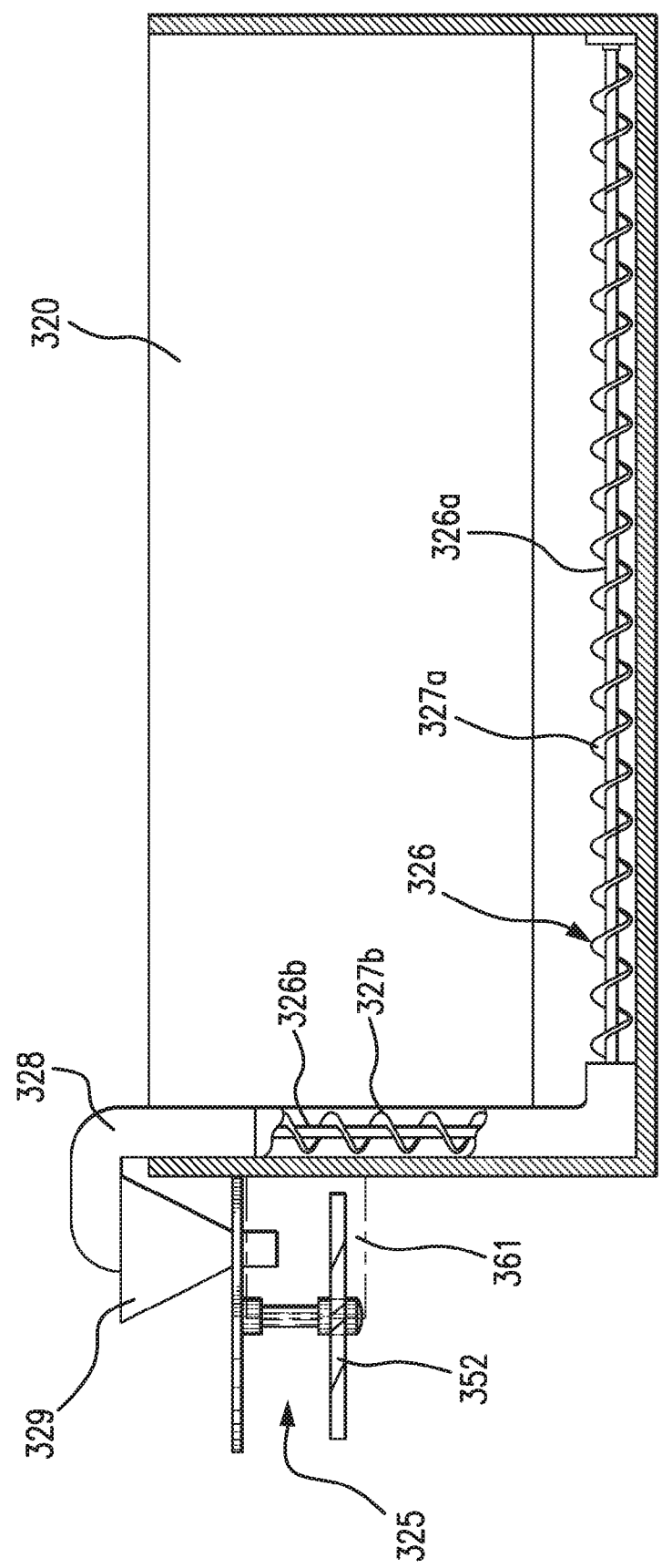
FIG. 12 is a side sectional view, partially cut away, of a storage and dispensing sub-system in an alternate embodiment of the mobile treatment unit for use in the system illustrated in FIG. 2.
Figure 13:
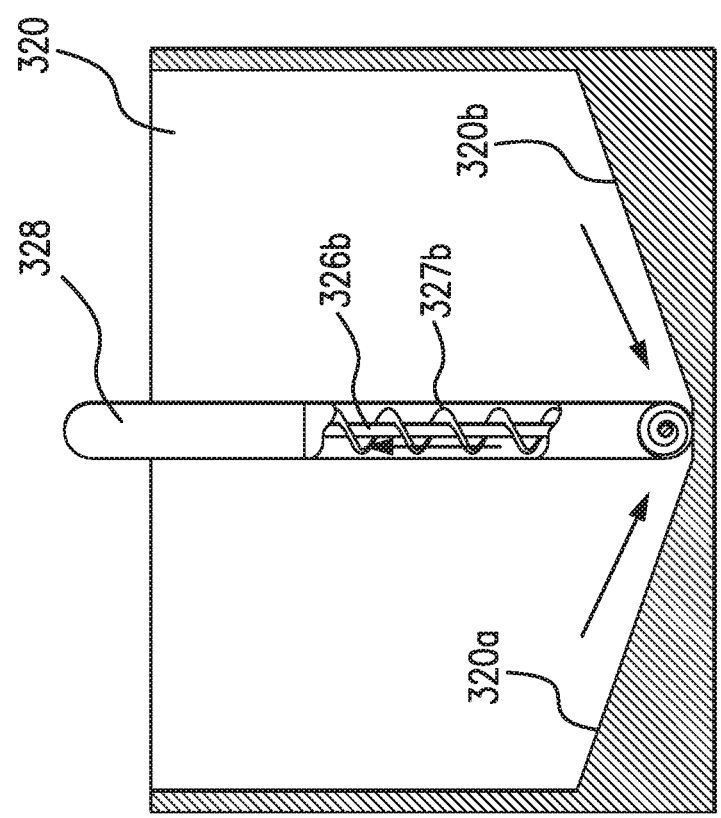
FIG. 13 is a rear sectional view of the storage and dispensing sub-system of FIG. 12.

As mentioned in preceding paragraphs, the mobile treatment unit of the subject system 10 need not employ active measures for delivery and/or dispensing of the treatment material from its hopper/storage container. Where such active measures are employed, they may be implemented using any suitable means known in the art beyond those shown in the preceding embodiment. As illustrated in FIGS. 12-13, for example, the storage compartment 320 of the mobile treatment unit in another exemplary embodiment incorporates an auger assembly 326 for moving treatment material from the storage compartment 320 out for external spreading by a dispenser 325. The auger assembly 326 in this illustrative embodiment includes a horizontally extended section 326a and a vertically extended section 326b. The section 326a, 326b are formed with respective helical portions 327a, 327b to advance the treatment material longitudinally along a bottom surface then up along a aft wall surface of the storage compartment 320 for delivery out therefrom. The vertically extended augur section 326b is at least partially enveloped by a chute 328 to provide the lateral containment necessary for the treatment material to be escalated upward for release out of the storage compartment 320. As shown, the chute 328 releases the escalated treatment material into a funnel member 329 which guides the same onto a dispenser having a rotary spreader 352 (and deflection plate 361 where appropriate for the operating conditions encountered in the intended application) for projection thereby onto the ground surfaces to be treated.

An advantage of this embodiment is that it affords elevation of the dispenser 325. The elevated dispensing point yields wider treatment area coverage and alleviates the risk of the track rails or other nearby structure obstructing the treatment. The elevated position of the dispenser 325 also makes it less likely to be clipped by any portion of a track rail as the mobile treatment unit 10 is maneuvered up and over it, and less accessible to surface growth or debris. Thus, the need for a protective shielding plate beneath the dispenser 325 is largely obviated.

The inner wall surfaces of the storage compartment 320 are similar in configuration to those in the preceding embodiment. The storage compartment is formed with a pair of banked floor surfaces 320a, 320b sloping downward toward the longitudinally directed segment 326a of the auger assembly 326. The treatment material tends to thus be gravity-fed downward to the auger segment 326a for delivery out of the storage compartment 320.

Figure 14A:
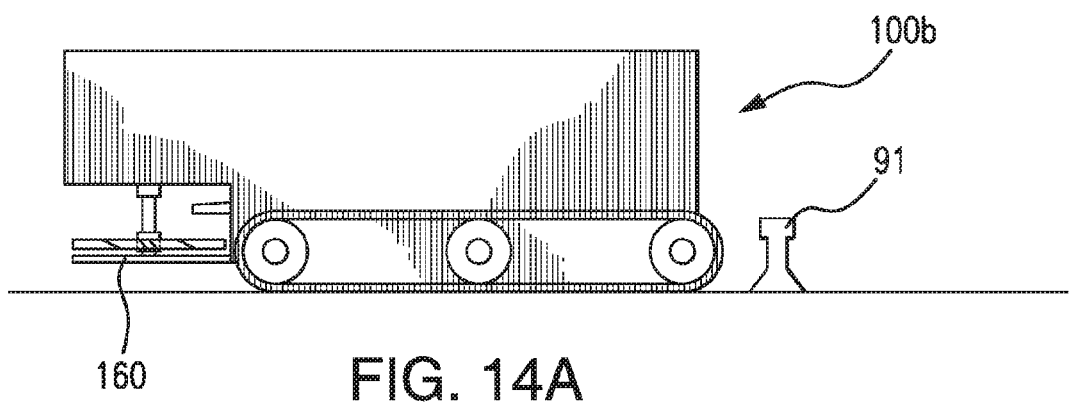
FIGS. 14A-14C is a sequence of schematic diagrams illustrating mobile treatment unit embodiment of FIG. 3*b* being maneuvered to traverse a track rail.
Figure 14B:
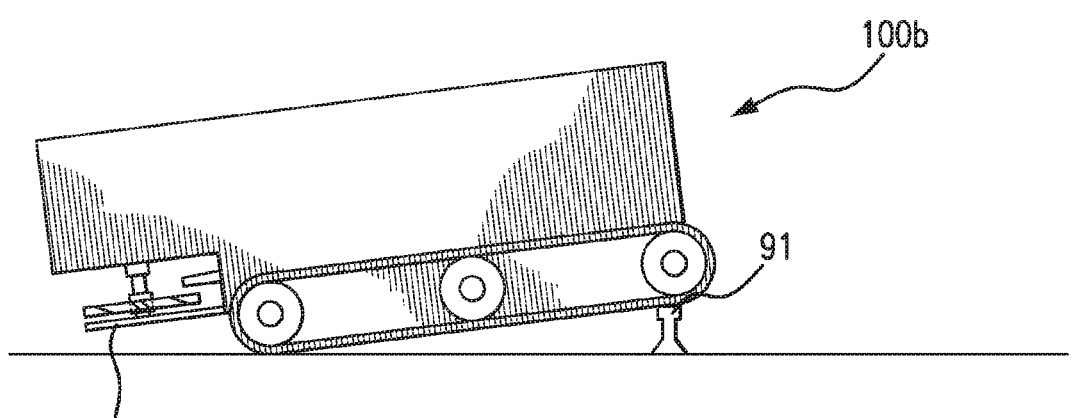
Figure 14C:
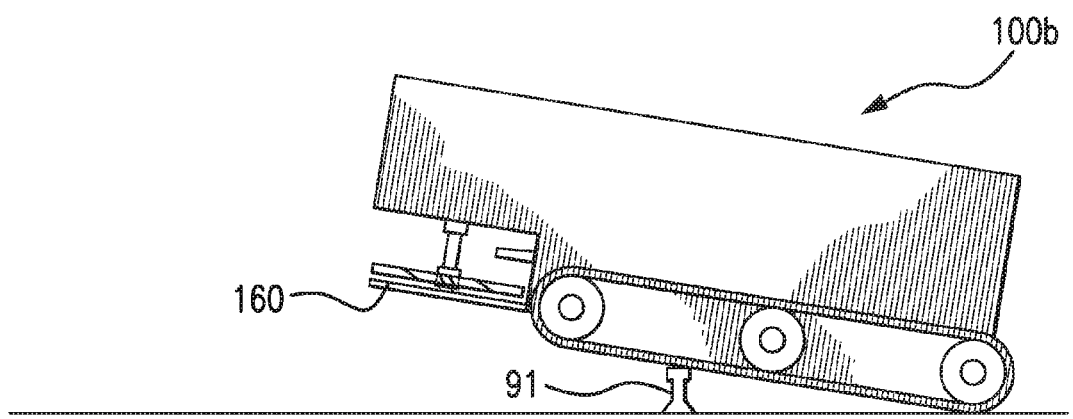

FIGS. 14a-14c provide a series of schematic diagrams illustrating a mobile treatment unit embodiment 100b, for instance, being maneuvered over a track rail 91 for repositioning onto or off of a rail track segment. As shown in FIG. 14a, the mobile treatment unit 100b is oriented to transversely approach the track rail 91 it must traverse. Then, the mobile treatment unit 100b engages and begins its climb over the track rail 91 as shown in FIG. 14b. The mobile treatment unit 100b continues thereafter, as shown in FIG. 14c, to advance over rail 91 and onto the ground surface on the other side. As the mobile treatment unit 100b continues, its aft portions extending beyond the continuous treads 132 is exposed to contact with rail 91 if not for the protective plate 160 shielding the contact. The protective plate 160 takes the rail's contact and slides thereover until the mobile treatment unit 100b advances far enough away for the protective plate 160 to clear the track rail 91 altogether.

Figure 15A:
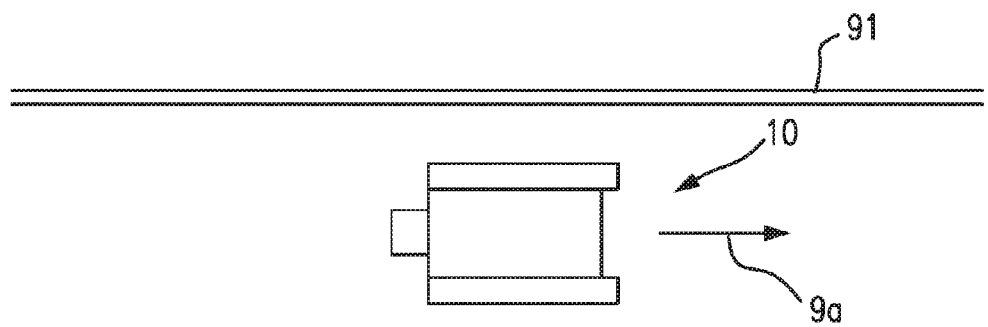
FIGS. 15A-15D is a sequence of schematic diagrams illustrating a mobile treatment unit for use in the system shown in FIG. 2, illustrating a series of maneuvers to exit a rail track segment following a treatment operation.
Figure 15B:
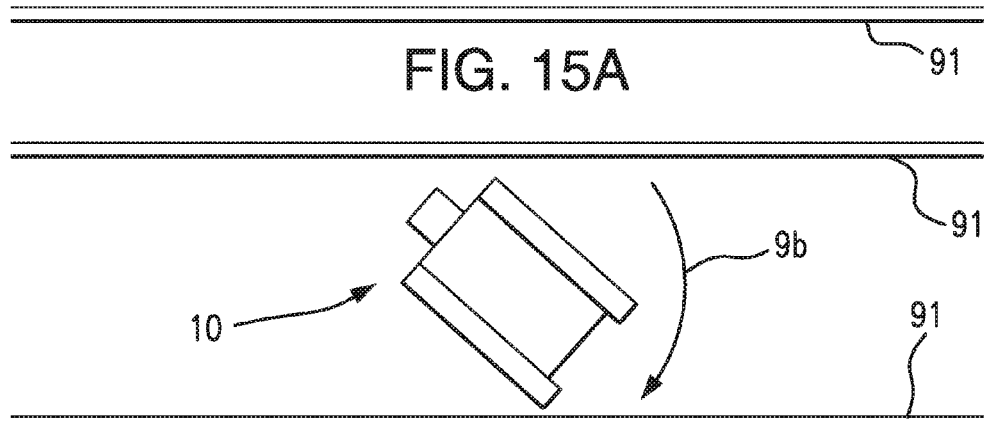
Figure 15C:
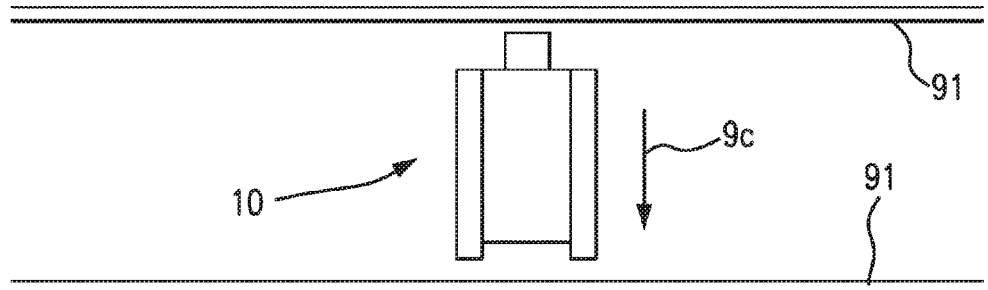
Figure 15D:
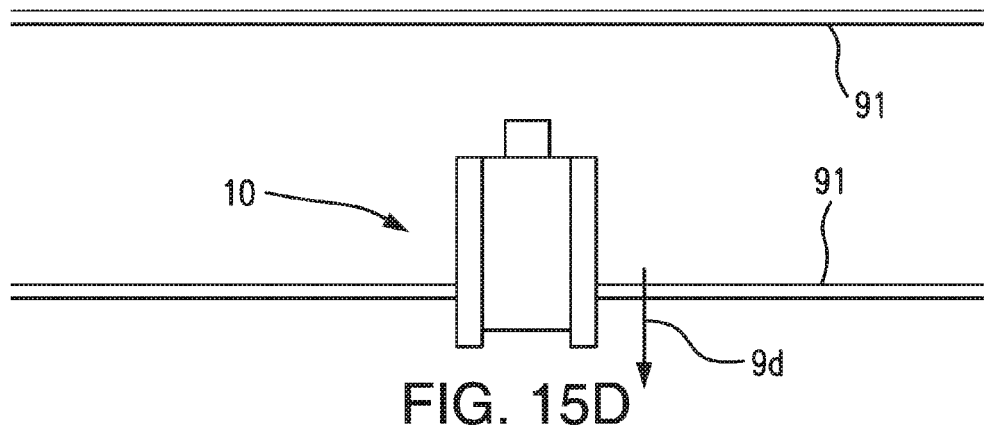

FIGS. 15A-15D provide another series of schematic diagrams illustrating how a mobile treatment unit 10 (generally indicated here without limitation to any embodiment particularly disclosed herein), having completed a treatment run between the parallel rails 91 of the given rail track segment, may be maneuvered off of the rail track. This may be from an open point along the rail track beyond an occupying rail vehicle, or from a point underneath an occupying rail vehicle laterally open between its track wheels. FIG. 15A shows the mobile treatment unit 10 situated between parallel rails 91 traveling forward along the given rail track in a direction 9a between the parallel rails 91 and underneath any rail vehicles which may be parked thereon. After treatment of the rail track segment has been completed, the mobile treatment unit 10 is turned as indicated by the directional arrow 9b shown in FIG. 15B. While FIG. 15B depicts the mobile treatment unit 10 turning in a clockwise direction, the mobile treatment unit 10 may just as well be turned in a counter-clockwise direction barring any obstacles which require otherwise. FIG. 15C shows the mobile treatment unit 10 having been fully turned to head transversely toward the proximate rail 91. The mobile treatment unit 10 then travels in direction 9c to engage, climb over, and travel past that rail 91 in the direction 9d, as shown in FIG. 15D.

As FIGS. 15A-15D illustrate, the mobile treatment unit 10 is preferably dimensioned in both length and width to be less than the space between opposing parallel rails 91 of the rail track. By being dimensioned in such a manner, the control unit may actuate the mobile treatment unit to turn entirely within the space between the opposing parallel rails. The mobile treatment unit may in alternate embodiments be dimensionally configured in any manner suitable to allow the unit to sufficiently turn and engage a proximate rail 91 to climb thereover.

For certain applications, the mobile treatment unit 10 may be configured to remain on one particular rail track segment, with each track segment being served by its own dedicated mobile treatment unit 10 to treat the ground surfaces thereabout, without the need to remove rail vehicles parked thereon. In those cases, the mobile treatment unit 10 may be formed with extended longitudinal length to accommodate a larger capacity storage compartment 20 for larger treatment area coverage during treatment sessions. While such a mobile treatment unit 10 would have diminished maneuverability in re-positioning from one track segment to another, it would decrease the frequency with which the storage compartment 20 would have to be refilled during a treatment session.

Turning next to FIGS. 16A-20, a mobile treatment unit 400 formed in accordance with yet another exemplary embodiment of the present invention is illustrated. The mobile treatment unit 400 in this embodiment is formed with a pair of independently driven wheel sets bilaterally disposed about a platform/chassis 430. Each wheel set includes a plurality of in-line wheel member 431 which are preferably co-driven by a powered chain-drive 436 or any other transmission sub-system known in the art. As described in preceding paragraphs, the drive power for the wheel sets may be generated by any suitable power plant known in the art, such as electric motor, fuel-burning engine, and the like. Each of the wheel members 431 are preferably formed with treading 431' such that the mobile treatment unit 400 may run directly on them. Alternatively, two or more of the wheel members 431 in each wheel set may be equipped with a slip-on continuous track 432 installed thereon, as illustrated in FIGS. 16A-16C. In the example of FIG. 16B, the slip-on continuous track 432*a* is formed for instance with a plurality of recesses 432*a*' each shaped and positioned to matedly receive an individual tread 431' formed on the wheel members 431, so as to be driven thereby through an endless drive loop. Similarly, in the example of FIG. 16C, the slip-on continuous track 432*b* is formed for instance with a plurality of cross-channels 432*b*' which matedly receive a row of wheel treads 431', so as to be driven thereby through an endless drive loop.

While each wheel set is shown with three constituent wheel members 431 in this particular embodiment, the mobile treatment unit 400 in alternate embodiments may employ various other wheel set configurations having different numbers and/or arrangement of wheel members 431. In this regard, the wheel sets are preferably configured with suitable spacing and dimensioning of the wheel members 431 to enable the mobile treatment unit 400 to traverse a track rail in the manner disclosed herein to accommodate proper treatment.

The mobile treatment unit 400 includes on its chassis 430 a hopper/storage compartment 420 preferably formed with portions in both its side walls (420*a*) and front and rear walls (420*b*) sloping downward toward a collection region of its floor surface. An auger assembly 426 equipped with a chute 428 extends upward from the collection region to pass out of the hopper 420 at an upper end of the hopper 430. One or more openings provided in the chute 428, such as indicated at 428', through which the treatment material gravitating downward enters the chute 428 through opening 428' to be delivered by the screw-drive action of auger 426 up to the chute's terminal opening. The delivered treatment material is released from there onto a dispenser 425 on which a rotary spreader 452 is driven by a motor 453 (housed within a case 453') to project the material rearward in a fanned out manner.

Figure 17:
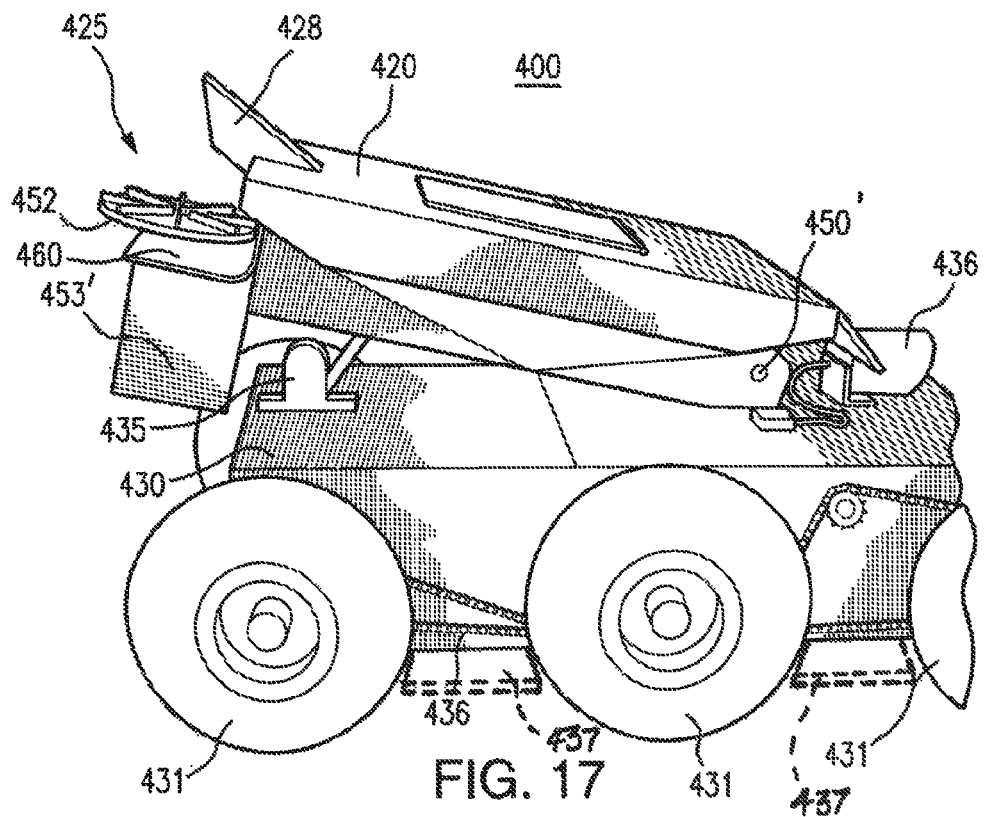
FIG. 17 is a right side perspective view, partially cut away, of the mobile treatment unit embodiment of FIG. 16A.

Operational adaptability of the mobile treatment unit 400 is enhanced in this regard by providing the hopper 420 in tiltable manner relative to the chassis 430 about a pivot member 436. The mobile treatment unit 400 is preferably equipped in this embodiment with a lift mechanism 435 which may be selectively actuated by a user to lift the aft end of the hopper 420 as shown in FIG. 17. This has the effect of raising the launch angle of the spreader that causes particulates of the treatment material to be flung thereby with greater arc, so that they may cover more distance before landing on the ground surfaces. A substantially L-shaped deflection plate situated to extend beneath and about a portion of the rotary spreader 452 helps to re-direct outward any residual particulates which for various reasons may have been errantly directed downward or inward (back toward the hopper 420).

The mobile treatment unit 400 is equipped with suitable on-board communications and control measures as described in preceding paragraphs preferably for bidirectional communication with the remote user control unit 5, 5'. Toward that end, the mobile treatment unit 400 includes an antenna 440 which serves the on board communications and control equipment 40 (housed within the chassis 430). The mobile treatment unit 400 further includes a video camera/sensor 450 which captures real time video data for feedback to the user control unit 5, 5'. The video camera 450 provides the visual feedback (displayed on the monitor 5*b* of the user control unit 5') necessary to detect where the mobile treatment unit 400 is located and headed, relative to the surrounding rails 91 and any occupying rail vehicles 80. When underneath a rail vehicle 80, the video camera 450 may advantageously also capture visual data by which inspection of certain rail vehicle 80 components may be made. Although not separately shown, the mobile treatment unit 400 preferably includes an illumination device either integrated with the camera 450 or incorporated as supplemental accessory on the chassis 430 to illuminate the area viewed through the camera 450.

Prompt, accurate visual feedback will obviously aid the proper operation of the mobile treatment unit 400. For instance, when the proximity of a rail vehicle is detected, such things as the lift mechanism 435 may be disabled to prevent the hopper 420 from being lifted into unwanted contact with components of a rail vehicle 80 overhead.

As mentioned in preceding paragraphs, the mobile treatment unit 400 is adapted in accordance with certain aspects of the present invention to gain subvehicular access to treat ground areas about rail tracks, while any rail vehicles occupying the tracks are left undisturbed to remain in situ during treatment. It is not uncommon for pipes, hoses, wires, harnesses or the like to hang downward from the bottom of a rail vehicle. As these hanging obstructions may pose a snagging or other interference hazard to the mobile treatment unit 400 passing underneath, measures are preferably taken to safeguard against its entanglement with such hanging obstructions. In addition to the overall low profile of the mobile treatment unit 400 generally, these safeguarding measures include for instance awning-like shielding extensions 421*a*, 421*b* flaring downward from the upper periphery of the hopper 420.

The safeguarding measures preferably also include attachable accessories such as a frontal shield or canopy 434 having a smooth dome or egg shape to deflect obstructions and hanging hazards, which may be used depending on the conditions expected for particular intended applications. Among other attachable accessories may be a hammerhead shaped front bumper 433 configured and positioned to wrap around the frontal extremities of the mobile treatment unit 400, including its bilateral wheel sets (with care taken to provide sufficient height clearance to avoid interference with the wheel sets' ability to optimally engage and overcome a raised obstacle such as a rail 91). During operation, the bumper 433 is likely to be the first portion of the unit 400 to contact with any obstacles in the path of travel. It would knock debris out of the way and deflect hanging obstacles upward and over to the canopy 434, which would further the deflection to permit unsnagged passage of the mobile treatment unit 400. The canopy 434, aside from protecting the unit 400 from contact with such hanging obstacles, also keeps unwanted debris, including loose treatment material from invading the covered portions of the unit 400. Where it is to protectively cover the camera 450, any illumination device(s), or the like, the canopy 434 is formed of a suitably transparent material so that operation is not obscured optically.

Figure 18:
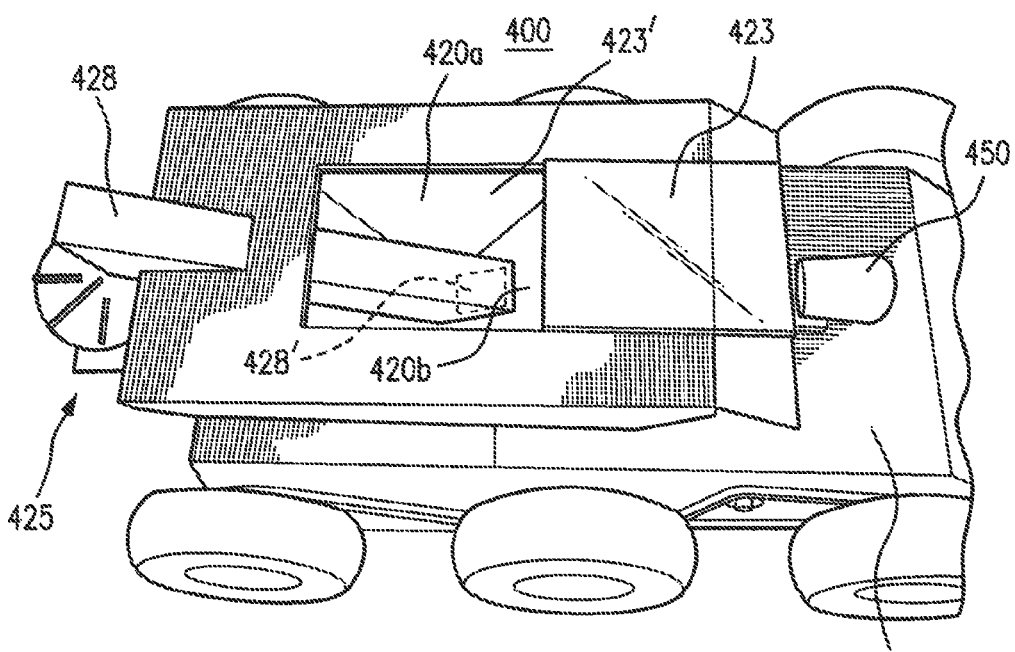
FIG. 18 is a top perspective view, partially cut away, of the mobile treatment unit embodiment of FIG. 16A.
Figure 19:
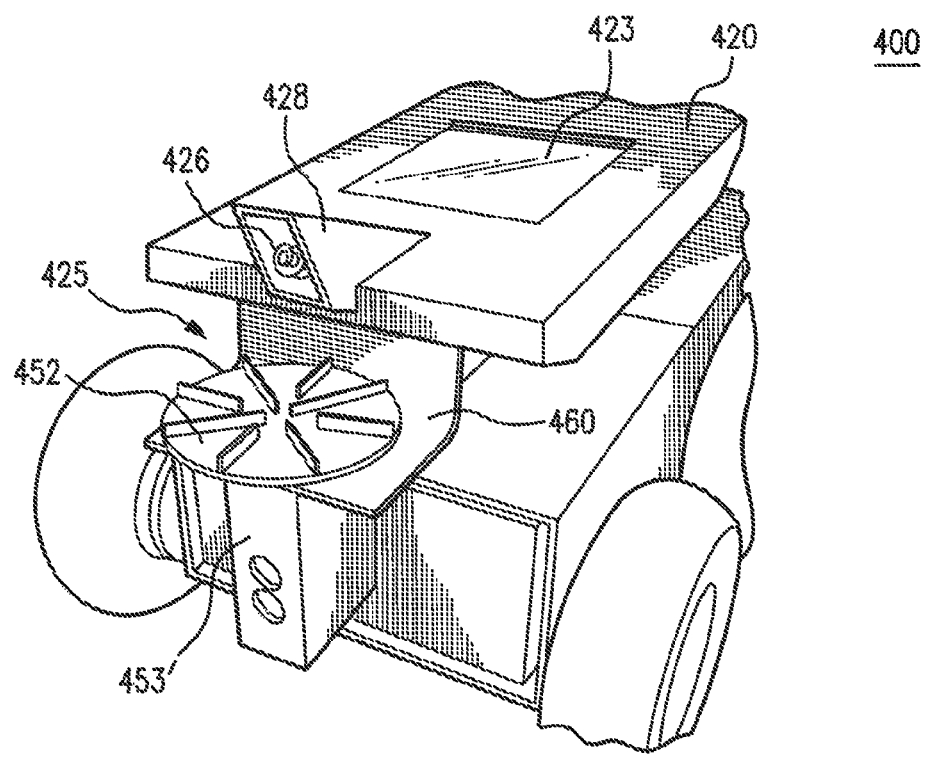
FIG. 19 is a rear perspective view, partially cut away, of the mobile treatment unit embodiment of FIG. 16A.
Figure 20:
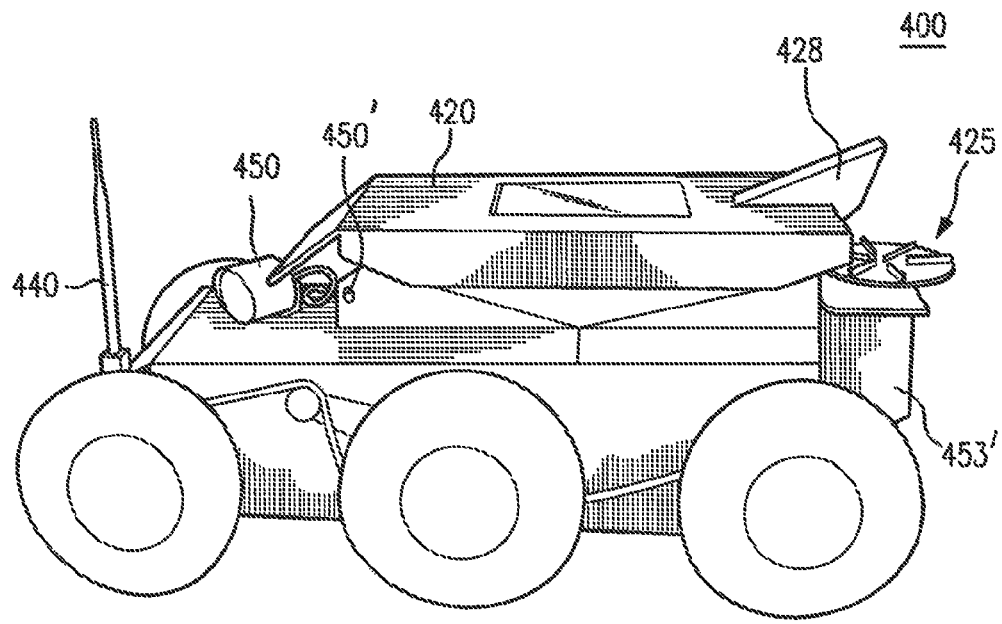
FIG. 20 is a left side perspective view of the mobile treatment unit embodiment of FIG. 16A; and, FIG. 21 is a side sectional view, partially cut away, of a storage and dispensing sub-system in the mobile treatment unit embodiment of FIG. 16A, with a supplemental attachment installed.

The wheel members 431 belonging to a common wheel set are clearly shown in FIGS. 17, 18. Coordinated drive of the individual wheel members 431 making up the wheel set is effected by a drive chain 436 looping about an axle of each wheel member 431 in a predetermined configuration. Distinguishable from the propulsion mechanisms employed in preceding embodiments of the mobile treatment unit 10, the treaded wheel members 431 in this embodiment are not enveloped by a continuously looped track (unless the slipion track 432 is installed over the given wheel set). The gap between consecutive in-line wheel members 431 is not blocked by the continuous track stretched therebetween. Accordingly, a plurality of ledge plates 437 are preferably formed extending laterally outward from the chassis 430 to protectively block the gaps. This prevents obstacles such as rails 91 to be traversed by the mobile treatment unit 400 from disruptively intruding into the gap. As can be seen with reference to FIG. 17, the ledge plates 437 are disposed to extend protectively beneath the drive chain 436 portions traversing the gaps, and are preferably formed of a metallic or other material of suitable strength, rigidity, and overall durability.

Turning to FIGS. 17-18, the hopper 420 is formed with an upper fill opening 423' over which a retractable cover 423 is disposed. The cover 423 prevents the treatment material from undesirable release as the mobile treatment unit 400 is jolted, rocked, and vibrated while traverses a track rail 91 or moving along the given rail track's roadbed during treatment. The cover 423 may be easily opened and closed for re-filling the hopper 420. While shown attached by hinged coupling to the hopper 420 (shown open in FIG. 18), the cover 423 may be widely varied in structural and intercoupling configuration, depending on the particular requirements of the intended application, in alternate embodiments.

Turning to FIG. 21, the various mechanisms operable in connection with the hopper 420 in the disclosed embodiment of the mobile treatment unit 400 are shown in greater detail. As shown, the auger assembly 426 is driven by a suitable electric motor 429 whose turning power is transferred by a mechanical linkage of any suitable type known in the art, such as illustrated. The auger assembly 426 includes an elongate shaft having a continuous helical portion wound thereabout, which when turned serves much as a screw drive that urges the treatment material entering the chute 428 upward to the chute's terminal dispensing end.

Material released from the chute's dispensing end normally drops freely onto the rotary spreader 452 driven by its electric motor 453. In certain applications where more precise delivery of the material to the spreader 452 is needed, an auxiliary dispensing chute attachment 428a is employed. This chute attachment 428a guides the treatment material which would otherwise fall freely from the mouth of the main chute 428 down to a release point immediately above a select optimal part of the rotary spreader 452 for projection outward thereby.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A method for subvehicularly accessed treatment of ground surfaces about a rail track occupied by a rail vehicle, comprising:
  establishing a mobile treatment unit having a propulsion mechanism and including at least one sensor unit coupled thereto to capture environmental feedback data about said mobile treatment unit;
  positioning said mobile treatment unit between the rails occupied by the rail vehicle for subvehicular passage therealong;
  actuating said mobile treatment unit to dispense a treatment material therefrom onto regions of the ground surface about the rails while maneuvering said mobile treatment unit between the rails;
  maintaining a height clearance for unobstructed passage of said mobile treatment unit beneath the occupying rail vehicle; and,
  controlling said mobile treatment unit through a communications link maintained therewith, said mobile treatment unit being controlled thereby responsive to at least one of said environmental feedback and a maneuver control command input.

2. The method as recited in claim 1, wherein a control unit is operably coupled to a controller established in said mobile treatment unit by a wireless communication link.

3. The method as recited in claim 1, wherein a storage compartment is established in said mobile treatment unit for holding the treatment material to be expelled from said dispensing portion to treat the ground surface about the rails.

4. The method as recited in claim 3, wherein a power driven actuator assembly is disposed in said storage compartment for automatically conveying the treatment material to said dispensing portion therefrom.

5. The method as recited in claim 4, wherein said power driven actuator assembly is established to include:
  an auger device at least partially extending upward from a floor portion of said storage compartment; and,
  a chute disposed about at least a portion of said auger device;
  wherein said auger is angularly displaced to convey the treatment material from said floor portion through said chute for elevated release from said storage compartment.

6. The method as recited in claim 2, wherein said maneuver control command is manually entered into said control unit for directing actuation of said mobile treatment unit responsive thereto.

7. The method as recited in claim 2, wherein said maneuver control command is programmably entered into said control unit for directing actuation of said mobile treatment unit responsive thereto.

8. The method as recited in claim 3, wherein said dispensing portion is power driven to generate a rotary spreading action at an aft end of said mobile treatment unit for projecting the treatment material received from said storage compartment onto the ground surfaces about the rails.

9. The method as recited in claim 1, wherein said mobile treatment unit includes a hopper and lift mechanism actuated to adjustably elevate an aft portion of said hopper for selectively adjusting a dispensing point for the treatment material in height and angular orientation.

10. The method as recited in claim 1, wherein said mobile treatment unit is established on a self-propelled vehicle platform supported by at least a pair of wheel sets coupled thereto, disposing in each said wheel set a plurality of wheel members arranged in line, said pair of wheel sets being bilaterally disposed at opposing lateral sides of said vehicle platform.

11. The method as recited in claim 10, wherein each of said wheel sets is enveloped by a continuous tread to be driven thereby through an endless loop thereabout.

12. A method for subvehicularly accessed treatment of ground surfaces about a rail track occupied by a rail vehicle, comprising:
  establishing a mobile treatment unit on a self-propelled vehicle platform supported by at least a pair of wheel sets coupled thereto, disposing in each said wheel set a plurality of wheel members arranged in line, said pair of wheel sets being bilaterally disposed at opposing lateral sides of said vehicle platform, actuating at least one sensor unit coupled to said vehicle platform to capture environmental feedback data about said mobile treatment unit;
  positioning said mobile treatment unit between the rails occupied by the rail vehicle for subvehicular passage therealong;
  actuating said mobile treatment unit to dispense a treatment material therefrom onto regions of the ground surface about the rails while maneuvering said mobile treatment unit between the rails;
  maintaining a height clearance for unobstructed passage of said mobile treatment unit beneath the occupying rail vehicle; and,
  controlling said mobile treatment unit through a wireless communications link maintained therewith, said mobile treatment unit being controlled thereby responsive to at least one of said environmental feedback and a maneuver control command input.

13. The method as recited in claim 12, wherein a power driven actuator assembly is disposed in a storage compartment for automatically conveying the treatment material to said dispensing portion therefrom.

14. The method as recited in claim 13, wherein said power driven actuator assembly is established to include:
  an auger device at least partially extending upward from a floor portion of said storage compartment; and,
  a chute disposed about at least a portion of said auger device;
  wherein said auger is angularly displaced to convey the treatment material from said floor portion through said chute for elevated release from said storage compartment.

15. The method as recited in claim 12, wherein said mobile treatment unit is maneuvered through a rail system having at least one ladder track configured portion for treatment of ground surfaces thereabout.

16. The method as recited in claim 15, wherein each of said wheel sets is enveloped by a continuous tread to be driven thereby through an endless loop thereabout.

17. A method for treatment of a ground surface about a rail track having a pair of substantially parallel rails, with a rail vehicle occupying the rail track remaining in situ thereon, comprising:
  establishing in a mobile treatment unit configured to maintain sufficient clearance along a full length of the occupying rail vehicle for unobstructed passage therebeneath:
    a storage compartment defining a space for holding a treatment material, said storage compartment being selectively power driven for regulating the passage of the treatment material therethrough;
    a dispensing portion coupled to said storage compartment for expelling the treatment material passed thereto from said storage compartment, said dispensing portion being selectively actuated for rotary spreading of the treatment material from said storage compartment onto regions of the ground surface adjacent the rails; and,
    at least one sensor unit coupled to said mobile treatment unit, said sensor unit being actuated to acquire environmental feedback data relative to said mobile treatment unit;
  propelling said mobile treatment unit for subvehicular passage between the rails underneath the rail vehicle;
  establishing a control unit operably coupled to said mobile treatment unit by a wireless communications link, said control unit receiving the environmental feedback data acquired by said sensor unit; and,
  actuating said control unit to selectively maneuver said mobile treatment unit in between the rails and selectively actuate dispensing of the treatment material therefrom responsive to at least one of said environmental feedback and a maneuver control command.

18. The method as recited in claim 17, wherein said mobile treatment unit is established on a self-propelled vehicle platform supported by at least a pair of wheel sets bilaterally disposed at opposing lateral sides of said vehicle platform, said mobile treatment unit being maneuvered through a rail system having at least one ladder track configured portion for treatment of ground surfaces thereabout.

19. The method as recited in claim 18, wherein each of said wheel sets is enveloped by a continuous tread to be driven thereby through an endless loop thereabout.

20. The method as recited in claim 19, wherein said mobile treatment unit includes a lift mechanism actuated to adjustably elevate an aft portion of said storage compartment for selectively adjusting a dispensing point for the treatment material in height and angular orientation.

* * * * *